United States Patent
Minami et al.

[11] Patent Number: 6,115,171
[45] Date of Patent: Sep. 5, 2000

[54] ELECTROCHROMIC DEVICE

[75] Inventors: Masaki Minami; Tsuyoshi Asano; Noboru Takaesu; Yoshinori Nishikitani, all of Yokohama, Japan

[73] Assignee: Nippon Mitsubishi Oil Corporation, Tokyo, Japan

[21] Appl. No.: 09/323,445

[22] Filed: Jun. 1, 1999

Related U.S. Application Data

[63] Continuation-in-part of application No. 09/012,465, Jan. 22, 1998, abandoned.

[30] Foreign Application Priority Data

Jan. 23, 1997 [JP] Japan ........................... 9-24336
Jan. 23, 1997 [JP] Japan ........................... 9-24337

[51] Int. Cl.$^7$ .................. G02F 1/11; G02F 1/15; G02B 26/00
[52] U.S. Cl. ............... 359/285; 359/265; 359/237
[58] Field of Search ................. 359/285, 265, 359/237

[56] References Cited

U.S. PATENT DOCUMENTS 4,278,804  7/1981  Ashby et al. ................ 556/436
4,373,060  2/1983  Ching ........................... 524/767

(List continued on next page.)

FOREIGN PATENT DOCUMENTS 980349      12/1975  Canada .
0 736 794 A2  10/1996  European Pat. Off. .

(List continued on next page.)

*Primary Examiner*—Scott J. Sugarman
*Assistant Examiner*—Michael A Lucas

*Attorney, Agent, or Firm*—Akin, Gump, Strauss, Hauer & Feld, L.L.P.

[57] ABSTRACT

An electrochromic device comprising a pair of electrically conductive substrates disposed facing each other and each having at least on its inner surface an electrode at least one of said electrically conductive substrates comprising a transparent substrate and a transparent electrode, an ion conductive material inserted between said pair of electrically conductive substrates, an electrochromic material-containing layer disposed between either one of said electrodes and said ion conductive material and an ultraviolet absorptive layer disposed between either at least one of said transparent substrates and the electrode disposed thereover or on the surface of said transparent substrate opposite to the transparent electrode disposed thereover, said ultraviolet absorptive layer being formed by coating and curing on the surface at said transparent substrate a reaction product of (A) an aminosilane compound of the formula (I) or the derivative thereof and (B) an ultraviolet absorptive material having in its molecules a carboxyl group, said formula (I) being represented by

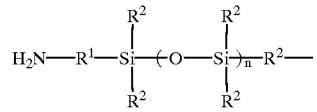

(I)

wherein $R^1$ is a $C_1$–$C_{10}$ alkylene group or a divalent group of the formula —$(CH_2)_m$—NH—m in which m is an integer of 1–4, the groups $R^2$ are the same or different and each selected from the group consisting of a hydrogen atom, a hydroxyl group, a halogen atom, a $C_1$–$C_{10}$ alkyl group and a $C_1$–$C_{10}$ alkyl group provided that at least one of the groups $R^2$ is an alkoxy group or a hydroxyl group and n is an integer of 0 or greater; said reaction product having amide bonds derived from said aminosilane compound or the derivative thereof.

24 Claims, 11 Drawing Sheets

U.S. PATENT DOCUMENTS

| | | | |
|---|---|---|---|
| 4,374,674 | 2/1983 | Ashby et al. | 106/287.12 |
| 4,419,405 | 12/1983 | Ashby et al. | 428/412 |
| 4,436,924 | 3/1984 | Ashby et al. | 556/416 |
| 4,863,802 | 9/1989 | Moore et al. | 428/412 |
| 5,073,012 | 12/1991 | Lynam . | |
| 5,355,245 | 10/1994 | Lynam | 359/267 |
| 5,618,626 | 4/1997 | Nagashima et al. | 428/412 |
| 5,627,227 | 5/1997 | Suga et al. | 524/91 |
| 5,770,314 | 6/1998 | Suga et al. | 428/412 |
| 5,780,160 | 7/1998 | Allemand et al. | 428/426 |
| 5,822,107 | 10/1998 | Lefrou et al. | 359/273 |
| 5,989,717 | 11/1999 | Allemand | 428/426 |

FOREIGN PATENT DOCUMENTS

| | | |
|---|---|---|
| 0 752 612 A1 | 1/1997 | European Pat. Off. . |
| 62-148339 | 7/1987 | Japan . |
| 63-236016 | 9/1988 | Japan . |
| 5-345639 | 12/1993 | Japan . |
| 6-056466 | 3/1994 | Japan . |
| 6-088064 | 3/1994 | Japan . |
| 62-215245 | 9/1997 | Japan . |
| 1 393 488 | 5/1975 | United Kingdom . |

ELECTROCHROMIC DEVICE

CROSS-REFERENCE TO RELATED APPLICATIONS

This application is a continuation-in-part of U.S. application Ser. No. 09/012,465, filed on Jan. 22, 1998 now abandoned.

BACKGROUND OF THE INVENTION

Devices utilizing electrochromic materials can be put to use in a variety of applications. However, conventional electrochromic devices are susceptible to deterioration under conditions where ultraviolet rays are emitted. In order to prevent such a deterioration, it has been proposed to arrange an ultraviolet barrier on the outer surface of a substrate. However, such barriers are not satisfactory in view of aesthetic considerations, resistance to abrasion and durability.

It has been known for the purpose of imparting ultraviolet absorptivity to a transparent substrate, such as a glass plate, to use multiple reflections of a multilayer or use a transparent substrate coated with an ultraviolet absorptive material. The method of using the multiple reflections is superior to the latter because of free adjustability of wavelength to be cut off and the capability of clear-cut, but is disadvantageous in production cost due to the complicated processes of making the multilayer that is required.

There are two types of ultraviolet absorptive materials one of which is an inorganic ultraviolet absorber. Inorganic ultraviolet absorbers as disclosed in Japanese Patent Laid-Open Publication Nos. 5-339033, 5-345639 and 6-56466 are superior in resistance to weathering, heat-resistance and durability, but are disadvantageous in that these absorbers are less selective because the wavelength of the ultraviolet to be absorbed is determined by the band gap of a compound used as a constituent component of the absorber and it is not possible to absorb ultraviolets in a neighborhood of 400 nm. Furthermore, these absorbers are acompanied by unexpected coloration upon the interception of ultraviolet of longer wavelength.

On the contrary, organic ultraviolet absorbers can capture ultraviolet in various wavelengths by selecting a membrane through a type, a concentration and a thickness. As a result of extensive research directed to such organic ultraviolet absorbers, it has now been found that the use of absorbers which have a maximum absorption wavelength in a range of longer wavelength or which have an increased concentration or thickness in of membrane is conducive to intercept ultraviolets in a longer wavelength. However, such absorbers having the maximum absorption wavelength in an area of a longer wavelength as disclosed in Japanese Laid-Open Publication No. 6-145387 is poor in resistance to light and reduced in absorption power with the lapse of time. The absorbers disclosed in the above-mentioned Japanese Patent Publication No. 6-1415387 has a problem that the permeability is easily deteriorated due to the use of a fluorescent bleach.

Benzophenoic- or benzotriazolic ultraviolet absorber is improved in resistance to light and capable of absorbing ultraviolets of a relatively longer wavelength by increasing the concentration and the thickness of the membrane. However, in the case of coating a mixture of the absorber and a resin over a substrate, the membrane formed thereover is limited in thickness to an extent of several tens of micrometer. If an attempt is made to absorb ultraviolet rays up to longer wavelength with the absorber coated in this order of thickness, it is required to add the absorber in a fairy high concentration to the mixture. However, the mere addition of the absorber in a high concentration leads to problems involving the deposition thereof and bleedout due to the use over extended periods of time.

It has been attempted for solving these problems to react an absorber with a resin in which instance an absorber is copolymerized with an acrylic resin, as disclosed in Japanese Patent Laid-Open Publication Nos. 2-248412 and 6-88064. However, since an acrylic resin per se has a drawback in resistance to weathering and heat, the resulting ultraviolet absorber can not bear to be used over prolonged length of time.

Furthermore, a various researches have been made in the use of an ultraviolet absorber which are reactive with a silicone resin as disclosed in Japanese Patent Laid- Open Publication No. 61-54800, 2-117928 and 3-45094. It, however, has been found that most of such absorbers have a difficulty in synthesis in technical view and a problem in durability.

Furthermore, it has also been proposed in Japanese Patent Laid-Open Publication No. 62-148339 and 63-236016 to avoid a deterioration of an electrochromic smart window caused by ultraviolet rays with the use of an ultraviolet barrier disposed on the inner surface of a pair of transparent electrodes which have therebetween an electrochromic layer and an electrolyte layer and are disposed between a pair of transparent substrates facing each other, whereby the transparent substrates are affected in resistance to marring.

However, an ultraviolet barrier of a metal oxide disclosed in Japanese Patent Laid-Open Publication No. 62-148339 can not suppress a deterioration caused by ultraviolet rays because it fails to intercept near ultraviolet rays sufficiently. In the case of employing a dichroic layer as an ultraviolet barrier, there arises a drawback in production costs due to the requirement of multiple membrane formation processes.

SUMMARY OF THE INVENTION

With the foregoing drawbacks and problems in view, the present invention therefore seeks to provide an electrochromic device which has resistance to ultraviolet radiation imparting the durability for outdoor use and can be produced in less costs.

According to the invention, there is provided an electrochromic device comprising a pair of electrically conductive substrates disposed facing each other and each having at least on its inner surface an electrode at least one of which said electrically conductive substrates comprises a transparent substrate and a transparent electrode; an ion conductive material inserted between said pair of electrically conductive substrates; an electrochromic material -containing layer disposed between either one of said electrodes and said ion conductive material and an ultraviolet absorptive layer disposed between either at least one of said transparent substrates and the electrode disposed thereover or on the surface of said transparent substrate opposite to the transparent electrode disposed thereover, said ultraviolet absorptive layer being formed by coating and curing on the surface of said transparent substrate a reaction product of (A) an aminosilane compound of the formula (I) or the derivative thereof and (B) an ultraviolet absorptive material having in its molecules a carboxyl group, said formula (I) being represented by

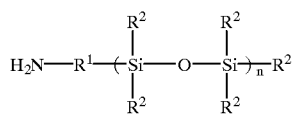

wherein $R^1$ is a $C_1$–$C_{10}$ alkylene group or a divalent group of the formula —$(CH_2)_m$—NH—m in which m is an integer of 1–4, the groups $R^2$ are the same or different and each selected from the group consisting of a hydrogen atom, a hydroxyl group, a halogen atom, a $C_1$–$C_{10}$ alkyl group and a $C_1$–$C_{10}$ alkyl group provided that at least one of the groups $R^2$ is an alkoxy group or a hydroxyl group and n is an integer of 0 or greater; said reaction product having amide bonds derived from said aminosilane compound or the derivative thereof.

The inventive electrochromic device has preferably an overcoat layer on the ultraviolet absorptive layer.

DETAILED DESCRIPTION OF THE INVENTION

The above and other features and advantages of the invention will be better understood from the following detailed description.

The electrochromic device according to the invention essentially comprises a pair of electrically conductive substrates disposed facing each other and each having at least on the inner surface thereof an electrode, an ion conductive material, an electrochromic material-containing layer and an ultraviolet absorptive layer.

In the present invention, there may be used any type of substrates as long as at least the inner surface thereof functions as an electrode. Specifically, the substrate may be those which are entirely made from a material functioning as an electrode or those which have an electrode disposed on the inner surface.

In the case where the whole substrate is made from an electrically conductive material, these materials may be selected from the group consisting of iron, copper, aluminum, tin, lead, gold, zinc and alloys thereof.

There is no particular limitation to the substrate which is provided with an electrode as long as it has a smooth surface. However, it is essential that one of the pair of the substrates be transparent. Specific examples of the substrate include plastics, resins, glasses, wool, stones or the like. Although not restricted, suitable transparent substrates are color or colorless glasses, reinforced glasses or resins having colored or colorless transparency. Specific examples of such resins include polyethylene terephthalate, polyamide, polysulfone, polyether sulfone, polyether etherketone, polyphenylene sulfide, polycarbonate, polyimide, polymethyl methacrylate and polystyrene.

The term "transparency" used herein designates optical transmission ranging from 1 to 100 percent. The substrate used for the invention has necessarily a smooth surface which may be flat or curved at normal temperature and may be deformable under stress.

In the case of using a pair of electrically conductive substrates each comprising a substrate and an electrode, the electrode has desirably transparency satisfying the above-defined requirement of the above-defined transparency. The electrode provided on a transparent substrate is also required to be transparent. The electrode is preferably arranged in the form of a membrane or a layer. Specific examples of the electrode include an electrically conductive membrane comprising a thin film of a metal such as gold, silver, chrome, copper and tungsten or a metal oxide such as ITO ($In_2O_3$—$SnO_2$), tin oxide, silver oxide, zinc oxide and vanadium oxide.

The electrode has a thickness in the range of usually 100 to 5,000, preferably 500 to 3,000 angstrom. The surface resistance of the electrode may be selected suitably depending upon the usage and applications but usually in the range of 0.5-500, preferably 1–50 $\Omega/cm^2$.

There is no particular limitation to the method of preparing the electrode used for the inventive electrochromic device. Any conventional methods may be selected suitably depending upon the metal and metal oxide constituting the electrode. In general, the electrode may be prepared by vacuum evaporation, ion plating, sputtering and a sol-gel method. In any case, the preparation of the electrode should be carried out when temperature of the substrate is in the range of 100–350° C.

The electrode may partially be provided with an opaque activator for electrodes in order to impart oxidation-reduction capability, electric conductivity and electric double layer capacitance. In the case where the electrode is transparent, the electrode activator is necessarily provided to an extent that the transparency of the entire electrode is maintained. Electrode activators eligible for the purpose of the invention include a metal such as copper, silver, gold, platinum, iron, tungsten, titanium and lithium, an organic material having oxidation-reduction capability such as polyaniline, polythiophen, polypyrrole and phthalocyanine, a carbon material such as active carbon and graphite and a metal oxide such as $V_2O_5$, $WO_3$, $MnO_2$, NiO and $Ir_2O_3$3 and mixtures thereof. These electrode activators may be integrated to the electrode with use of a variety of resins. The opaque electrode activator may applied onto an electrode by forming on an ITO transparent electrode a composition comprising an active carbon fiber, graphite and an acrylic resin into a micro pattern in the shape of stripes or by forming on a thin-film of gold a composition comprising $V_2O_5$, acetylene black and butyl rubber in the shape of mesh.

The ion conductive material used for the inventive electrochromic device is arranged so as to be inserted between the pair of the above-mentioned electrically conductive substrates. There is no particular limitation to the method of arranging the ion conductive material. There may be employed a method in which the ion conductive material is charged into the space between the two conductive substrates, such as a vacuum injection method, an atmospheric injection method and a meniscus method. Alternatively, there may be used a method in which a layer of the ion conductive material is formed on the electrode of one of the conductive substrates by sputtering, vacuum evaporation or a sol-gel method and then this substrate is combined with the other. Furthermore, there may be used a method in which glass substrates are laminated using a film-like ion conductive material. There is no particular limitation to the ion conductive material as long as it can color, bleach and discolor an electrochromic material hereinafter described. The ion conductive material has preferably an ion conductivity of more $1 \times 10^{-7}$ S/cm at room temperature and may be liquid, gel or solid. The solid ion conductive material is particularly preferred for the purpose of the invention.

Eligible liquid ion conductive materials are those dissolving a supporting electrolyte such as salts, acids and alkalis in a solvent. Any suitable solvents may be used as long as they can dissolve a supporting electrolyte. Preferred are those having polarity. Specific examples of such solvents include water and an organic polar solvent such as methanol, ethanol, propylene carbonate, ethylene carbonate, dimethylsulfoxide, dimethoxyethane, acetonitrile, r-butyrolactone, sulforan, 1,3-dioxane, N,N-dimethylformamide, 1,2-dimethoxyethane and tetrahydrofuran. Preferred are propylene carbonate, ethylene carbonate, dimethylsulfoxide, dimethoxyethane, acetonitrile, r-butyrolactone, sulforan, 1,3-dioxane, N,N-dimethylformamide, 1,2-dimethoxyethane and tetrahydrofuran. These may be used singular or in combination.

Although not restricted, salts used as a supporting electrolyte may be alkali metal salts, inorganic ion salts such as alkali earth metal salts, quaternary ammonium salts and cyclic quaternary ammonium salts. Specific examples of such salts include alkali metal salts of lithium, sodium or potassium such as $LiClO_4$, $LiSCN$, $LiBF_4$, $LiAsF_6$, $LiCF_3SO_3$, $LiPF_6$, LiI, NaI, NaSCN, $NaClO_4$, $NaBF_4$, NaAsF. KSCN and KCl, quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBR$, $(C_2H_5)_4NClO_4$ and $(n-C_4H_9)_4NClO_4$ and mixtures thereof.

Acids used as a supporting electrolyte may be exemplified by inorganic acids and organic acids which include sulfuric acid, hydrochloric acid, phosphoric acid, sulfonic acid and carboxylic acid.

Alkalis used as a supporting electrolyte include sodium hydroxide, potassium hydroxide and lithium hydroxide.

The gelatinized-liquid ion conductive material may be those which are gelatinized or made to be viscous by adding the above-mentioned liquid ion conductive material with a polymer or a gelatinizer.

Suitable polymers may be polyacrylonitrile, carboxymetylcellulose, polyvinyl chloride, polyethylene oxide, polyurethane, polyacrylate, polymethacrylate, polyamide, polyacrylamide, cellulose, polyester, polypropyleneoxide and nafion.

Suitable gelatinizers include oxyethylenemethacrylate, oxyethyleneacrylate, urethaneacrylate, acrylamide and agar—agar.

There is no particular limitation to the solid ion conductive material if it is solid at room temperature and ion conductive. Preferred are poiyethyleneoxide, polymer of oxyethylenemethacrylate, nafion, polystyrene sulfonate, $Li_3N$, $Na$-$\beta$-$Al_2O_3$ and $Sn(HPO_4)_2H_2O$. Particularly preferred are solid polyelectrolytes derived from the polymerization of a polyethyleneoxide based compound, an oxyalkyleneacrylate based compound and a urethaneacrylate based compound.

First example of such solid polyelectrolytes is that derived from solidifying a composition (hereinafter referred to as Composition (a)) containing the above-described organic polar solvent, the above-described supporting electrolyte and an urethaneacrylate of the formula wherein $R^1$ and $R^2$ may be the same different and each are a group of formula (IIa), (IIb) or (IIc), $R^3$ and $R^4$ may be the same or different and each are a $C_1$–$C_{20}$ divalent hydrocarbon residue, Y is a polyether unit, a polyester unit polycarbonate unit and mixed unit thereof and n is an integer of 1–100, preferably 1–50, more preferably 1–20.

Formula (IIa), (Iib) or (IIc) is represented by

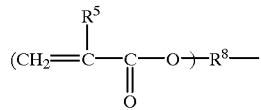

(IIa)

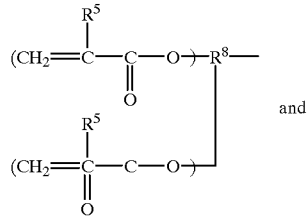

(IIb)

and

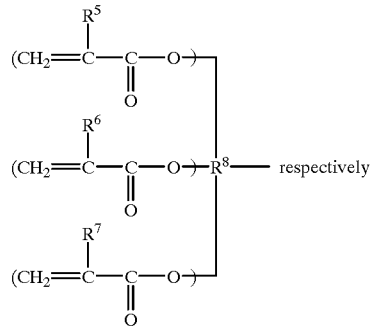

(IIc)

respectively wherein $R^5$, $R^6$ and $R^7$ may be the same or different and each are a hydrogen atom or a $C_1$–$C_3$ alkyl group and $R^8$ is a $C_1$–$C_{20}$, Preferably $C_2$–$C_8$ organic residue of ranging from divalent to quatervalent.

Specific examples of the organic residue include a hydrocarbon residue such as alkylytolyl, alkyltetratolyl and alkylene represented by the formula

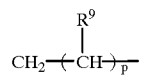

(III)

wherein $R^9$ is a $C_1$–$C_3$ alkyl group or hydrogen, p is an integer of 0–6 and if p is greater than 2 the groups of $R^9$ may be the same different.

The hydrocarbon residue may be a group of which hydrogen atoms are partially substituted by an oxygen-containing hydrocarbon group such as a $C_1$–$C_6$, preferably $C_1$–$C_3$ alkoxy group and a $C_6$–$C_{12}$ aryloxy group. Specific (II)

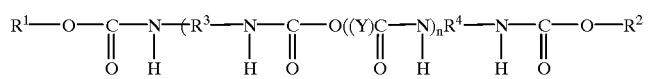

examples of the group $R^8$ in formulae (IIa), (IIb) and (IIc) are those represented by the following formulae $$—CH_2CH_2— \quad \text{(IVa)}$$

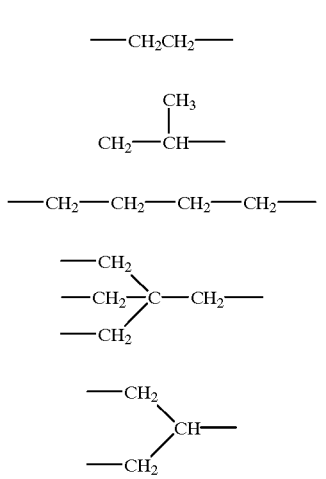

(IVb)

$$—CH_2—CH_2—CH_2—CH_2— \quad \text{(IVc)}$$

(IVd)

(IVe)

$R^3$ and $R^4$ in formula (II) may be the same or different and each are a $C_1$–$C_{20}$, preferably $C_2$–$C_{12}$ divalent hydrocarbon residue. Such hydrocarbon residues include divalent chain-like hydrocarbon groups, aromatic hydrocarbon groups and aliphatic hydrocarbon groups. Specific examples of the chain-like divalent hydrocarbon groups may be those represented by formula (III).

Specific examples of the aromatic hydrocarbon groups and the aliphatic hydrocarbon groups may be those represented by the following formulae $$—R^{10}—(\!CH_2\!)_q—R^{11} \quad \text{(Va)}$$

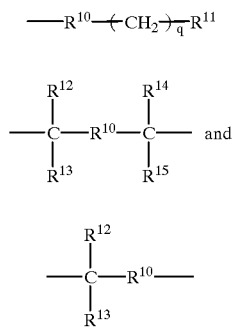

(Vb) and (Vc)

wherein $R^{10}$ and $R^{11}$ may be the same or different and each are a phenylene group, a phenylene group having an alkyl subsutituent, a cycloalkylene group and a cycloalkylene group having an alkyl substituent, $R^{12}$, $R^{13}$, $R^{14}$ and $R^{15}$ may be the same or different and each are a hydrogen atom or a $C_1$–$C_3$ alkyl group and q is an integer of between 1 and 5.

Specific examples of the groups $R^3$ and $R^4$ in formula (II) are those represented by the formulae

(VIa)

-continued

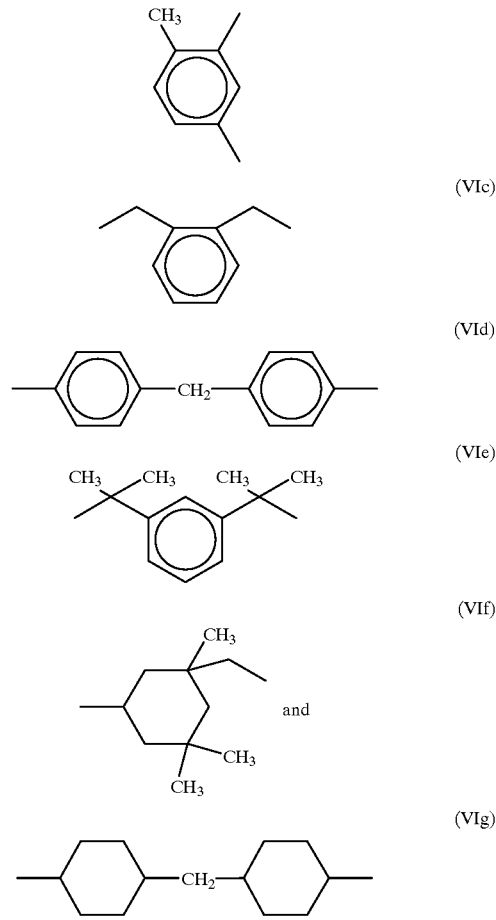

(VIb), (VIc), (VId), (VIe), (VIf), and (VIg)

In formula (II), Y indicates a polyether unit, a polyester unit, a polycarbonate unit and mixed unit thereof. These units may be exemplified by the units represented by the following formulae

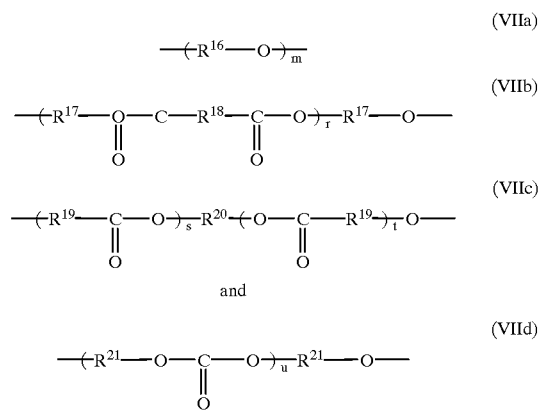

(VIIa), (VIIb), (VIIc), and (VIId)

wherein $R^{16}$ through $R^{21}$ may be the same or different and each are a $C_1$–$C_{20}$, preferably, $C_2$–$C_{12}$ divalent hydrocarbon residue, m is an integer of 2–300, preferably 10–200, r is an integer of 1–300, preferably 2–200, s is an integer of 1–200, preferably 2–100 and u is an integer of 1–300, preferably 10–200.

$R^{16}$ through $R^{21}$ are preferably straight or branched alkylene groups among which methylene, ethylene, trimethylene, tetramethylene, pentamethylene, hexamrethylene and propylene groups are preferred for $R^{18}$, and ethylene and propylene groups are preferred $R^{16}$, $R^{17}$ and $R^{19}$ through $R^{21}$.

In formulae (VIIa) through (VIId), each units may be copolymers of the same or different units. In other words If there exists a plurality of the groups $R^{16}$ through $R^{21}$ the groups among each $R^{16}$, $R^{17}$, $R^{18}$, $R^{19}$, $R^{20}$ and $R^{21}$ may be the same or different. Preferred examples of the copolymers include a copolymer of ethylene oxide and propylene oxide.

The urethaneacrylate of formula (II) has a molecular weight in the range of 2,500–30,000, preferably 3,000–20,000.

The urethaneacrylate has preferably 2–6, more preferably 2–4 functional groups per molecule.

The urethaneacrylate may be prepared by any suitable conventional methods.

There is no particular limitation to the above-mentioned organic polar solvent if it has a polarity and can dissolve a supporting electrolyte. Preferred are propylenecarbonate, ethylenecarbonate, butylenecarbonate, r-butyrolactone, sulforane, 1,3-dioxane, N,N-demethylformaidehyde, 1,2-dimethoxyethane, acetonitrile, tetrahydrofuran and mixtures thereof.

The content of the organic nonaqueous solvent is in the range of 100–1,200, preferably 200–900 weight part per 100 parts of the urethaneacrylate. Too less content would lead to insufficient ion conductivity, while too much content would lead to a reduction of mechanical strength.

The supporting electrolyte may be selected suitably depending upon the usage and applications of the polymeric solid electrolyte. Preferred are those already exemplified above. The content of the supporting electrolyte is in the range of 0.1–30, preferably 1–20 weight percent of the organic nonaqueous solvent.

Composition (a) is essentially derived from solidification of the urethaneacrylate, the organic nonaqueous solvent and the supporting electrolyte. If necessary, Composition (a) may be added with any suitable components as long as they are not obstructive to the achievement of the purpose of the invention. Such components may be crosslinkers and polymerization initiators.

The solid polymeric electrolyte of the first example may be inserted between the pair of conductive substrates by injecting and then curing Composition (a) into a selected space in a conventional manner and curing the same. The term "curing" used herein designates a state where polymerizing or crosslinking component is cured with the progress of polymerization (polycondensation) or crosslinking and thus the composition does not flow at room temperature, in this case, the composition has the basic structure in the form of network.

The second example of the polymeric solid electrolyte is derived from curing Component (B) comprising an organic polar solvent, a supporting electrolyte and a mono- or poly-functional acryloyle-modified polyalkylene oxide represented by the formula

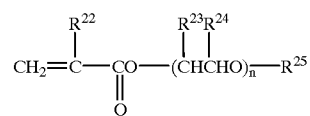

(VIII)

wherein $R^{22}$, $R^{23}$, $R^{24}$ and $R^{25}$ may be the same or different and each are hydrogen and an alkyl group having 1–5 carbon atoms and n is an integer of greater than 1.

$R^{22}$, $R^{23}$, $R^{24}$ and $R^{25}$ each are hydrogen and an alkyl group having 15 carbon atoms. Specific examples of the alkyl group include methyl, ethyl, i-propyl, n-propyl, n-butyl, t-butyl and n-pentyl. Preferred for $R^{22}$, $R^{23}$, $R^{24}$ and $R^{25}$ are hydrogen and methyl group, hydrogen and methyl group, hydrogen and methyl group and hydrogen, methyl and ethyl, respectively.

n is an integer of greater than 1, usually between 1 and 100, preferably 2 and 50, more preferably 2 and 30. Specific examples of the compound include those having oxyalkylene units in the range of 1–1 00, preferably 2–50, more preferably 1–20 such as methoxypolyethylene glycol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof.

If n is greater than 2, the compound may be those having different oxyalkylene units, that is, copolymerized oxyalkylene units which for instance have oxyethylene units in the range of 1–50, preferably 1–20 and oxypropylene units in the range of 1–50, preferably 1–20. Specific examples of the compound having such polymerized oxyalkylene units are (ethylene•propylene) glycol methacrylate, ethoxypoly (ethylene•propylene) glycol methacrylate, methoxypoly (ethylene•propylene) glycol methacrylate, methoxypoly (ethylene•propylene) glycol acrylate, ethoxypoly methoxypoly (ethylene•propylene) glycol acrylate and mixtures thereof.

The polyfunctional acryloyl-modified polyalkylene oxide may be a bifunctional acryloyl-modified polyalkylene oxide represented by the formula

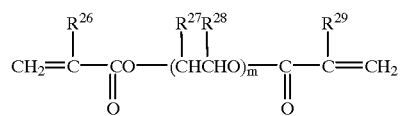

(IX)

wherein $R^{26}$, $R^{27}$, $R^{28}$ and $R^{29}$ each are hydrogen, and a $C_1$–$C_5$ alkyl group and m is an integer of greater than 1, or a trifunctional acryloyl-modified polyalkylene oxide represented by the formula

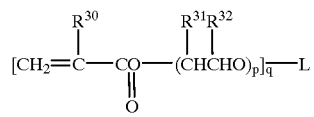

(X)

wherein $R^{30}$, $R^{31}$ and $R^{32}$ each are hydrogen and a $C_1$–$C_5$ alkyl group, p is an integer of greater than 1, q is an integer of 2–4 and L is a connecting group of valence indicated by q.

$R^{26}$, $R^{27}$, $R^{28}$ and $R^{29}$ each are hydrogen and a $C_1$–$C_5$ alkyl group such as methyl, ethyl, i-propyl, n-propyl, n-butyl, t-butyl, t-butyl and n-pentyl among which hydrogen and methyl are particularly preferred.

m in formula (IX) is an integer of greater than 1, usually 1–100, preferably 2–50, more preferably 2–30. Preferred examples of the compound of formula (IX) are those having 1–100, preferably 2–50, more preferably 1–20 oxyalkylene units such as polyethylene glycol diacrylate, polypropylene glycol dimethacrylate, polyethylene glycol diacrylate, polypropylene glycol dimethacrylate and mixtures thereof.

If m is greater than 2, the compound of formula (IX) may be those having different oxyalkylene units, that is, polymerized oxyalkylene unit having 1–50, preferably 1–20 oxyethylene units and 1–50, preferably 1–20 oxypropylene units, such as poly(ethylenepropylene)glycol dimethacrylate, poly(ethylene•propylene)glycol diacrylate and mixtures thereof.

$R^{30}$, $R^{31}$ and $R^{32}$ m formula (X) each are hydrogen and a $C_1$–$C_5$ alkyl group such as methyl, ethyl, i-propyl, n-propyl, n-butyl, t-butyl and n-pentyl. Particularly preferred are hydrogen and a methyl group.

p is an integer of greater than 1, usually between 1 and 100, preferably 2 and 50, more preferably 2 and 30.

q is a number of connecting group "L" and an integer of between 2 and 4.

Connecting group "L" is a divalent, trivalent or quatravalent hydrocarbon group having 1–30, preferably 1–20 carbon atoms.

The divalent hydrocarbon may be alkylene, arylene, arylalkylene, alkylarylene and a hydrocarbon having those groups as the base skeleton. Specific examples of the hydrocarbon are those represented by the following formulae

(XIa)

(XIb)

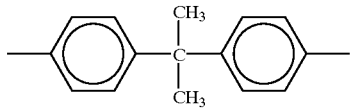
(XIc)

The trivalent hydrocarbon may be alkyltryl, aryltryl, arylalkyltryl, alkylaryltryl and a hydrocarbon having these groups as the base skeleton. Specific examples of the hydrocarbon are those represented by the following formulae

(XIIa)

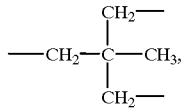
(XIIb)

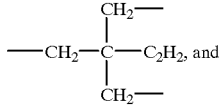

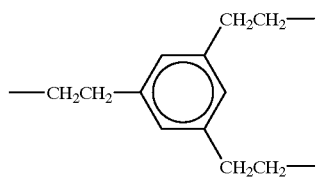
(XIIc)

The quatravalent hydrocarbon may be alkyltetraaryl, aryltetraaryl, arylalkyltetraaryl and a hydrocarbon having these groups as the base skeleton. Specific examples of the hydrocarbon are those represented by the formula

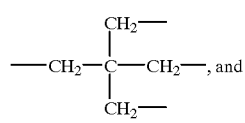
(XIIIa)

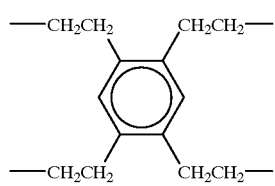
(XIIIb)

Specific examples of the compound of formula (X) are those having 1–100, preferably 2–50, more preferably 1–20 of an oxyalkylene units such as
trimethylolpropanetri(polyethylene glycol acrylate),
trimethylolpropanetri (polyethylene glycol methaacrylate),
trimethylolpropanetri (polypropylen glycol acrylate),
trimethylolpropanetri (polypropylen glycol methaacrylate),
tetramethylolmethanetetra(polyethylene glycol acrylate),
tetramethylolmethanetetra (polyethylene glycol methaacrylate),
tetramethylolmethanetetra(polypropylene glycol acrylate),
tetramethylolmethanetetra(polypropylene glycol methaacrylate),
2,2-bis[4-(acr yloxypolyethoxy)phenyl]propane,
2,2-bis[4-(methaacryloxypolyethox y)phenyl]propane,
2,2-bis[4-(acryloxypolyisopropoxy)phenyl]propane,
2,2-bis[4-(methaacryloxypolyisopropoxy)phenyl]propane and mixtures thereof.

If p is more than 2, the compound of formula (X) may be those having different oxyalkylene units, that is, polymerized oxyalkylene units having 1–50, preferably 1–20 of an oxypropylene unit. Specific examples include
trimethylolpropanetri(poly(ethylene•propylene)glycol acrylate),
trimethylolpropanetri(poly(ethylene•propylene)glycol methaacrylate),
tetramethylolmethanetetra(poly(ethylene•propylene) glycol acrylate),
tetramethylolmethanetetra(poly(ethylene•propylene) glycol acrylate) and mixtures thereof.

Needless to mention, there may be used the difunctional acryloyl-modified polyalkyleneoxide having two functional groups of formula (IX) and the polyfunctional acryloyl-modified polyalkylene oxide in combination. When used in combination, the weight ratio of the compound of formula (IX) to the compound (X) is in the range between 0.01/99.9 and 99.9/0.01, preferably 1/99 and 99/1, more preferably 20/80 and 80/20. The weight ratio of the compound of formula (VIII) to the polyfunctional acryloyl-modified polyalkyleneoxide is in the range of usually between 1/0.001 and 1/1, preferably 1/0.05 and 1/0.5.

The above-described organic polar solvent should be added in an amount of 50–800, preferably 100–500 weight percent based on the total weight of the compound of formula (VIII) and the polyfunctional acryloyl-modified polyalkyleneoxide.

The above-described supporting electrolyte should be added in an amount of 1–30, preferably 3–20 weight percent based on the total weight of the compound of formula (VIII), the polyfunctional acryloyl-modified polyalkyleneoxide and the organic polar solvent.

If necessary, Composition (b) may be added with another components as long as they do not adversely affect the inventive electrochromic device. Although not restricted, such components may be photopolymerization initiators or thermal polymerization initiators. These initiators should be contained in an amount of 0.05–5, preferably 0.01–3 weight percent based on the total weight of the compound of formula (VIII) and the polyfunctional acryloyl-modified polyalkylene oxide.

The second example of the polymeric solid electrolyte may be inserted between the pair of substrates facing each other by charging and then curing Component (B) into a selected site in a conventional manner. The "curing" used herein designates a state where a polymerizable or crosslinkable component such as monofunctional or polyfunctional acryloyl-modified polyalkyleneoxide is cured with the progress of polymerization or crosslinking and hence the composition entirely stays unfluidized. In this case, the monofunctional or polyfunctional acryloyl-modified polyalkyleneoxide has the basic structure in the form of networks.

The electrochromic device according to the invention has a layer containing an electrochromic material between the ion conductive material and either one of the electrodes formed on the inner surface of substrates.

The electrochromic materials eligible for the purpose of the invention are those which are colored, bleached or discolored by electric chemical oxidation or reduction. Although not restricted, preferred electrochromic materials are $MO_2O_3$, $Ir_2O_3$, $NiO$, $V_2O_5$, $WO_3$, biologen, polythiophen, polyaniline, polypyrrole and metal phthalocyanine.

The electrochromic material-containing layer may be layers (membranes) containing solely the electrochromic material or layers (membranes) obtained by dispersing the electrochromic material in a matrix compound. The former is preferred for the purpose of the invention.

The electrochromic material-containing layer has a thickness in the range of 10 nm–1 $\mu$m, preferably 50–800 nm.

There is no particular limitation to the method of forming the electrochromic material-containing layer. It may be formed in a variety of known processes such as vacuum evaporation, ionplating, sputtering, electrolytic polymerization, dip coating and spin coating.

The electrochromic device according to the invention has a pair of conductive substrates at least one of which is necessarily a transparent substrate provided with a transparent electrode on the surface facing the other substrate. Furthermore, the inventive electrochromic device has an ultraviolet absorptive layer which is located between the transparent electrode and the transparent substrate or on the other surface of the transparent substrate which surface is devoid of the transparent electrode. In the case where the electrochromic device comprises a pair of conductive substrates both of which comprise a transparent substrate and a transparent electrode, the ultraviolet absorptive layer is disposed between one of the electrodes and the substrate thereof and/or between the other electrode and the substrate thereof or on the surface of at least one or both of the substrates which surface is devoid of are the electrodes.

In the case where the electrochromic device comprises a pair of conductive substrates one of which consisting of an opaque conductive substrate and/or an opaque electrode, the ultraviolet absorptive layer is always arranged between the transparent substrate and the transparent electrode or on the surface of the transparent substrate which surface is devoid of the transparent electrode. Alternatively, the ultraviolet absorptive layer may be arranged between the opaque substrate and the opaque electrode or on the surface of the opaque substrate which is opposite to the electrode.

The ultraviolet absorptive layer is prepared by coating and curing on the transparent substrate a reaction product of a) an aminosilane compound represented by formula (I) or the derivative thereof (hereinafter referred to as Component (A)) and b) an ultraviolet absorptive material having carboxyl groups in its molecules (hereinafter referred to as Component (B)), the reaction product having an amide bond derived from the aminosilane compound or the derivative thereof. The aminosilane compound used for Component (A) is represented by the formula

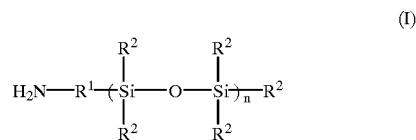

(I)

In formula (I), $R^1$ is a $C_1$–$C_{10}$ Preferably $C_1$–$C_5$ alkylene group or a divalent group represented by the formula —$(CH_2)$—NH— wherein m is an integer of between 1 and 4. Such alkylene groups may be methylene, ethylene, trimethylene and propylene. The groups $R^2$ may be the same or different and each are a hydrogen atom, a hydroxyl group, a halogen atom such as chlorine and bromine, a $C_1$–$C_{10}$, preferably $C_1$–$C_5$ alkyl or alkoxy group and a $C_6$–$C_8$ aryl group provided that at least one of the groups $R^2$ is an alkoxy group or a hydroxyl group. Preferred alkyl groups are methyl, ethyl, propyl and i-propyl. Preferred aryl groups are phenyl and tolyl. Preferred alkoxy groups are methoxy, ethoxy, propoxy and i-propoxy. n is an integer of greater than 0, preferably between 0 and 3.

Preferred examples of the aminosilane compound of formula (I) are 3-aminopropyltriethoxysilane, 3-aminopropyidiisopropylethoxysilane, 3-aminopropylmethyidiethoxysilane, 3-aminopropyltrichlorosiiane, 3-aminopropylpolydimethylsiloxane, N-(2-aminoethyl)-3-aminopropyltrimethoxysilane and 3-aminopropyltris (methoxyethoxy)silane. Preferred examples of the derivatives of the aminosilane compound are hydrolyzates of the above preferred compounds. Component (A) is prepared by any suitable conventional methods.

The ultraviolet absorptive material (compound) used for Component (B) may be those having one or more of a carboxyl group at the side chain in the molecule. Preferred are compounds having a benzotriazole skeleton or a benzophenon skeleton. Preferred compounds having a benzotriazole ring are those represented by the formula

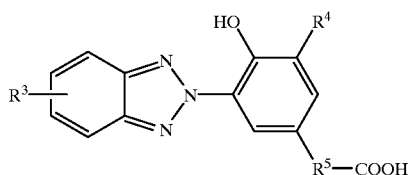

(XIV)

In formula (XIV), $R^3$ is a hydrogen atom, a halogen atom including fluorine, chlorine, bromine and iodine and a $C_1$–$C_{10}$, preferably $C_1$–$C_6$ alkyl group including methyl, ethyl, propyl, i-propyl, butyl, t-butyl and cyclohexyl groups. $R^3$ is substituted at the 4 or 5-position of the benzotriazole ring, while the halogen atom and the alkyl group are usually located at the 4-position. $R^4$ is a hydrogen atom or a $C_1$–$C_{10}$, preferably alkyl group such as methyl, ethyl, propyl, i-propyl, butyl, t-butyl and cyclohexyl. $R^5$ is a $C_1$–$C_{10}$, preferably $C_1$–$C_3$ alkylene group such as methylene, ethylene, trimethylene and propylene and an alkyliden such as ethliden and propylidene.

Specific examples of the compound of formula (XIV) are 3-(5-chloro-2H-benzotriazole-2-yl)-5-(1,1-dim ethylethyl)-4-hydroxy-benzene propanoic acid, 3-(2H-benzotriazole-2-yl)-4-hydroxybenzene ethanoic acid and 3-(5-methyl-2H-benzotriazole-2-yl)-5-(1-methylethyl)-4hydroxybenzenepropanoic acid.

Preferred compounds having the benzophenone skeleton are benzophenone- based compounds represented by the following formulae

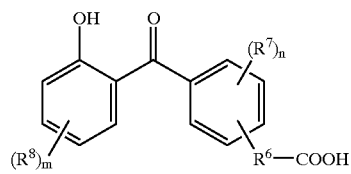

(XV)

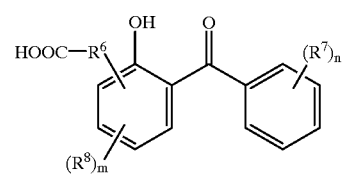

(XVI)

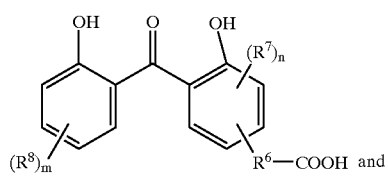

(XVII)

and

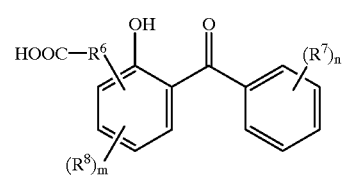

(XVIII)

In formulae (XV), (XVI) and (XVII), $R^7$ and $R^8$ may be the same or different and each are a hydrogen atom, a hydroxyl group and a $C_1$–$C_{10}$, preferably $C_1$–$C_6$ alkyl or alkoxy group. n and m are an integer of between 0 and 3 and an integer of between 0 and 3 respectively. Specific examples of the alkyl group include methyl, ethyl, propyl, i-propyl, butyl, t-butyl and cyclohexyl, while those of the alkoxy groups include methoxy, ethoxy, propoxy, i-propoxy and butoxy. R6 is a $C_1$–$C_{10}$, preferably $C_1$–$C_3$ alkylene group such as methylene, ethylene, trimethylene and propylene and an alkylidene group such as ethylidene and propylidene. Preferred examples of the compound having such benzophenone skeleton include 2-hydroxy-4-methoxybenzophenon-5-carboxylic acid,
2,2'-dihydroxy-4-methoxybenzophenone-5-carboxylic acid and
4-(2-hydroxybenzoyl)-3-hydroxybenzene propanoic acid.

The ultraviolet absorptive material having the benzotriazole ring or the benzophenone ring may be prepared in a conventional manner.

In the preparation of the ultraviolet absorbing material, dehydration reaction is generally employed to react Components (A) and (B) in order to derive amide bonds from Component (A).

There is no particular limitation to the amount of the amide bond to be produced. Components (A) and (B) are reacted so that an amide bond is derived from more than 10, preferably 50 mol percent of all aminosilane of Component (A). Upper limit of the amount of the amino bonds is 100 mol percent but less than 100 mol percent is still acceptable.

Although the ultraviolet absorbing material used for the invention is prepared by reacting merely Components (A) and (B), optional components may be co-existed or added during or after the reaction within a range which is not obstructive to the achievement of the purpose of the invention. Herein below these optional components will be described.

One example of such optional components is exemplified by silicon resins (hereinafter referred to as Component (C)). Component (C) is preferably reactive silicone resins having a functional group which can be reacted with the alkoxysilyl group of Component (A), the reaction being dehydration and/or a reaction with removal of alcohol. Preferred functional groups are an alkoxysilyl group and a silanol group.

Such reactive silicone resins are readily synthesized by subjecting alkoxysilanes or chlorosilanes to partial hydrolysis and thereafter condensation. Commercially available reactive silicone resins are pure silicone varnishes as manufactured by Okitsumo Co. Ltd. under the trade name of "XO7931-Clear", silicone resins as manufactured by Tore-Dowcorning Silicone Co. Ltd. under the trade name of "SR241 O" and acrylyl-modified silicone resins as manufactured by Chisso Co. Ltd. under the trade name of "Sairacoat 1000".

These silicone resins may be put in use in the form of a solution containing a variety of solvents within a range which is not obstructive to the achievement of the purpose of the invention. Although not restricted, preferred solvents are a variety of hydrocarbon-based solvents, ketones, ethers, esters and etheresters. The silicone resins may be those having been modified. Component (C) may be co-existed during or after the reaction between Components (A) and (B), the former being particularly preferred.

The other example of the optional components are a variety of epoxysilanes (hereinafter referred to as Component (D)) which are preferably represented by the formulae

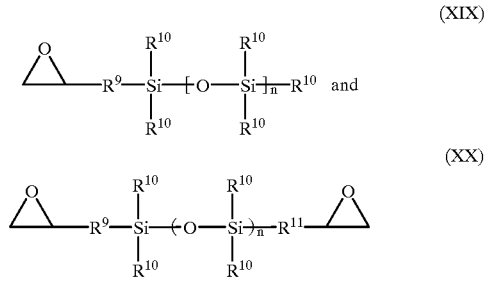

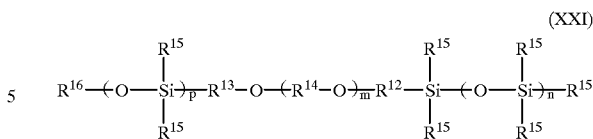

In formulae (XIX) and (XX), $R^9$ and $R^{11}$ may be the same or different and each are a $C_1$–$C_{10}$, preferably $C_1$–$C_5$ alkylene group and a divalent group represented by the formula —R—O—$R^1$— wherein R and $R^1$ each are an alkylene group, the groups $R^{10}$ may be the same or different and each are a hydrogen atom, a hydroxylyl group, a halogen atom, a $C_1$–$C_{10}$, preferably $C_1$–$C_5$ alkyl or alkoxy group and a $C_1$–$C_{10}$, preferably $C_5$–$C_8$ aryl group provided that at least one of the groups $R_{10}$ is preferably a $C_1$–$C_5$ alkoxy group or a hydroxyl group and n is an integer of greater than 0, preferably between 0 and 3.

Preferred examples of the alkylene group are methylene, trimethylene and tetramethylene. Preferred examples of the alkyl group are methyl, ethyl, propyl, i-propyl, butyl, t-butyl, pentyl, hexyl, heptyl and octyl groups. Preferred examples of the alkoxy group are methoxy, ethoxy, propoxy, butoxy, t-butoxy, pentyloxy and hexyloxy groups. Preferred examples of the aryl group are phenol and tolyl groups.

Preferred examples of Component (D) are 3-glycidoxypropyltrimethoxysilane, dimethoxy-3-glycidoxypropylmethylsilane, 2-(3,4-epoxycycichexylethyl)trimethox ysilane, 2-(3,4-epoxycyclohexylethyl)trimethoxysilane, dimethylethoxy-3-glycidopropylsilane, 1,3-bis(3-glycidoxyp.ropyl)-1,3-dimethyl-1,3-dimethoxydisiloxane and mixtures thereof.

Component (D) may be those which had been hydrolyzed in advance. Alternatively, Component (D) may be put in use after the epoxy group thereof being subjected to ring open polymerization with the use of a suitable polymerization catalyst. The polymerization catalyst may be Lewis acid catalyst such as a boron trifluoride diethylether complex, aluminum chloride and diethyl zinc. There is no particular limitation the ring opening polymerization conditions. The polymerization temperature may be in the range of between −80 and 130° C., preferably −20 and 80° C. and the reaction time may be selected depending upon the conditions and modes of the reaction but usually between 10 minutes and 10 hours, preferably 1 hour and 6 hours. Although not restricted to the solvent used for the polymerization, there may be used an aromatic hydrocarbon solvent and varied types of ketons and esters.

Although Component (D) may be co-exited upon and after the reaction of Components (A) and (B), Component (D) is preferably added after the reaction. In the case of using Component (D) which had been polymerized to open the ring of the epoxy group thereof, Component (D) is preferably added upon the reaction of Components (A) and (B). X Another example of the optional component is a polyether-modified polysiloxane (hereinafter referred to as Component (E)) and preferably represented by the formula wherein $R^{12}$, $R^{13}$ and $R^{14}$ may be the same or different and each are a $C_1$–$C_{10}$, preferably $C_1$–$C_5$ alkylene group, the groups $R_{15}$ may be the same or different and each are a 23 hydrogen atom, a hydroxyl group, a halogen atom, a $C_1$–$C_{10}$, preferably $C_1$–$C_5$ alkyl or alkoxy group and a $C_6$–$C_{10}$, preferably $C_6$–$C_8$ aryl group, one of the groups $R^{15}$ being preferably a $C_1$–$C_{10}$ alkoxy group, m is an integer of greater than 0, preferably between 1 and 10, n is an integer of greater than 0, preferably between 0 and 10, p is an integer of greater than 0, preferably between 0 and 10.

The alkylene group exemplarily includes methylene, trimethylene and tetramethylene. The alkyl group exemplarily includes methyl, ethyl, propyl, i-propyl, buty, t-butyl, pentyl, hexyl, heptyl and octyl. The alkoxy group exemplarily includes methoxy, ethoxy, propoxy, butoxy, t-butoxy, pentyloxy and hexyloxy. The aryl group exemplarily includes phenyl and tolyl.

Component (E) of formula (XXI) exemplarily includes tetraethyleneglycol-bis(triethoxysilylethyl) ether, polyethyleneglycol-bis(triethoxysilylethyl) ether, polypropyleneglycol-bis(triethoxysilylethyl)ether and mixtures thereof. Component (E) may be those which had been hydrolyzed.

Although Component (E) may be co-existed upon or after the reaction of Component (A) and (B), the addition of Component,(E) upon the reaction is preferred.

The use of the optional components particularly such as Components (D) and (E) results in ultraviolet absorptive layer coated over the substrate which layer is improved in adhesivity to the substrate without marring heat resistance and less susceptible to breakage even with the thickness increased.

The other example of the optional component is an inorganic fine particle dispersion (referred hereinafter to as Component (F)). Component (F) exemplarily includes dispersions of fine particles of such as silica, alumina, titanium oxide and antimony oxide. The fine particles are on the order of 1–100 nm in particle diameter. The dispersion medium may be water, methanol, xylene and methylethyl ketone. Among those commercially available, preferred are "LUDOX LS" manufactured by Dupont and "XBA-ST" manufactured by Nissan Chemical Co. Ltd.

Although Component (F) may be co-existed upon or after the reaction of Components (A) and (B), the former is preferred. Component (F) leads to an improvement of the resulting ultraviolet absorptive layer in surface hardness and in resistance to wear and chemicals.

The aforementioned optical components may be prepared by a conventional method.

The ultraviolet absorbing material to be put in use by coating may be prepared by reacting Components (A) and (B) solely or in the presence of the above-described optional components as needed.

There is no particular limitation to the reaction conditions as long as amide bonds derived from Component (A) are produced. Generally, there may be mixed Components (A) and (B) and if needed the optional components in a solvent, followed by the reaction at a temperature ranging from room temperature to 350° C., preferably 60 to 350° C., and more preferably 60 to 250° C., for 5 minutes to 50 hours, preferably 10 minutes to 15 hours. The reaction may be repeated.

The solvent used for this reaction is not restricted as long as it does not bother the accomplishment of the purpose intended by the invention. There may be used for such solvents an aromatic solvent such as toluene and xylene, a ketone-based solvent such as cyclohexane and a mixture thereof. The solvent may be removed after the reaction or may be in a solution state without being removed.

There is no particular limitation to the reaction between Components (A) and (B). The amount of Component (B) may be selected from the ranges between 5–90, preferably 10–80 mass percent based on the total mass of Components (A) and (B).

The ultraviolet absorbing material may be coated immediately after completion of the reaction. Alternatively, the ultraviolet absorbing material may be added with a variety of components after completion of the reaction.

Such components exemplarily include an antioxidant, a quencher, a free-radical capturing agent, an inorganic or organic acid such as hydrochloric acid, sulfuric acid and acetic acid, a Lewis acid such as boron trifluoride•diethylether complex, a sodium antimony acid hexafluoride, a base such as potassium hydroxide, sodium hydroxide, triethylamine and aniline, a catalyst having a curing acceleration effect (to be used in an amount of 0.1–5.0 mass percent based on the ultraviolet absorbing material) such as an organic metal as exemplified by dibutyltin dilaurate and titanium tetraiso propoxide and a solvent such as a variety of thinner including toluene, xylene, ethanol, isopropanol, dimethylformaldehyde, cyclohexane and 1-methoxy-2-acetoxypropane.

The above-mentioned silicone resin may be used in an amount of 5–30, preferably 20–150 mass percent based on the total mass of Components (A) and (B).

The above-mentioned epoxysilanes may be used in an amount of 10–500, preferably 100–400 mass percent based on the total mass of Components (A) and (B).

The polyether-modified polysiloxanes may be used in an amount of 10–500, preferably 100–400 mass percent based on the total mass of Components (A) and (B).

The inorganic fine particle dispersions may be used in an amount of 5–400, preferably 10–200 percent by mass based on the total mass of Components (A) and (B).

The ultraviolet absorptive layer is prepared by coating and curing the ultraviolet material thus produced on a transparent substrate.

The ultraviolet absorptive material is usually in a liquid state. Therefore, the ultraviolet material may be coated by any suitable conventional methods such as spin coating, spray coating, dip coating, cast coating blade coating and flow coating.

The ultraviolet absorptive material can be cured by heating at temperature between room temperature and 250° C., preferably 60 and 250° C. if the aforesaid catalyst having an acceleration effect used and can be cured by heating at a temperature usually between room temperature and 350° C., preferably 60 and 250° C. without the catalyst, the coating reaction may be carried out usually for 10 minutes to 5 hours.

Needless to mention, a substrate may or may not have an electrode on one of its surface upon application of the ultraviolet absorptive layer. If necessary, a protective layer may be used for the sake of protecting the ultraviolet absorptive layer and the electrolyte during the processes of the production.

The ultraviolet absorptive layer to be formed on a transparent substrate may selectively have a thickness in the range of usually 0.5–50 $\mu$m. Less than 0.5 $\mu$m would result in insufficient capability of intercepting ultraviolets, while greater than 50 $\mu$m would lead to a difficulty in coating due to cracking.

In order to protect the ultraviolet absorptive layer and/or enhance resistance to wear thereof, there may be provided a overcoat layer over the ultraviolet absorptive layer or between the electrode and the ultraviolet absorptive layer.

Although not restricted, preferred for the overcoat layer are resins excelled in resistance to wear and weathering. Specific examples include a silicone resin such as polyimide, polyamide, polycarbonate, polyacrylate, polyethersulfone, melamine resin, phenolic resin, epoxy resin and silicone varnish and a urea resin among which the silicone resins are particularly preferred. These may be used in combination or together with a glass filler or an inorganic powdery material.

There may be used a corpuscle such as ZnO, $TiO_2$, $CeO_2$ and silica as the inorganic powdery material. There may be used a silicone resin which has inorganic fine particles such as a colloidal silica dispersed therein and partially dehydrated products or partially condensed products of silanes such as alkoxysilane and chlorosilane. Specific examples of commercially available products include "Tossguard 510" manufactured by Toshiba Silicone, "APZ7703" and "APZ7705" manufactured by Nihon Unicar and polyslazane manufactured by Tohnen under the trade names of N-L110 and N-L710. A partially dehydrated product of epoxysilane is also known as a suitable overcoat material which is superior in resistance to wear. There is no particular limitation to the method of forming an overcoat layer. Generally, the overcoat layer may be formed by coating a solution of the resins or the precursor thereof. After the coating, a suitable treatment may be conducted selectively depending upon the nature of the resin. Alternatively, there may be employed a method in which a film is coated over the resin.

Specifically, a silicone varnish is added with a catalyst such as dibutyltin dilaurate and coated over the ultraviolet absorptive layer, followed by curing at a temperature of 100–200° C. for 5 minutes to 2 hours thereby obtaining an overcoat layer having a thickness of 1–20 $\mu$m. Alternatively, an acryl-melamine resin precursor is coated and then cured at a temperature of 130–190° C. for 5 minutes to 2 hours thereby obtaining an overcoat layer having a thickness in the range of 10–100 Jim within 5 minutes. Alternatively, a photo-setting type acrylyl based resin precursor is coated and the placed under irradiation from a high-tension mercury vapor lamp thereby providing an overcoat layer having a thickness in the range of 10 $\mu$m within 5 minutes.

The coating may be conducted by a known method for which instance spin coating, spray coating, blade coating and dip coating may be used.

Alternatively, prior to forming an overcoat layer the coatability and adhesivity thereof to an ultraviolet absorptive layer can be improved by optical surface modification and primary coating.

The above objects and features of the invention will be better understood from the following detailed description taken in connection with the accompanying drawings illustrated by way of example a preferred embodiment.

DETAILED DESCRIPTION OF THE INVENTION

Figure 1:
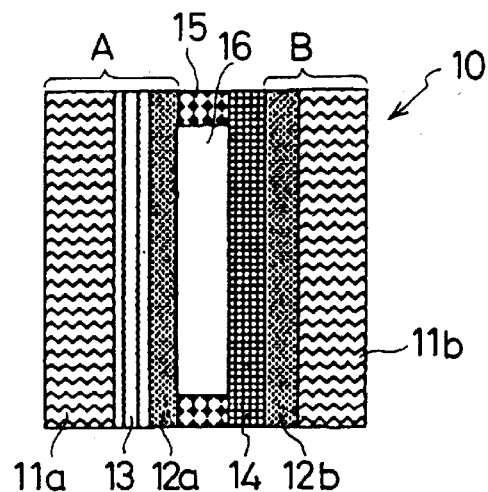
FIG. 1 illustrates the structure of an electrochromic devise according to a first embodiment of the invention.
Figure 2:
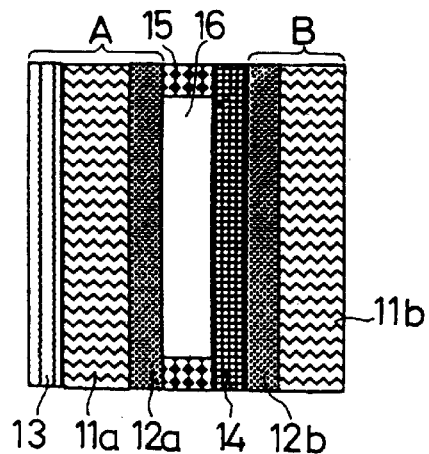
FIG. 2 illustrates the structure of an electrochromic devise according to a second embodiment of the invention.

Referring to the drawings and FIGS. 1 and 2 in particular, there are shown two typical forms of the inventive electrochromic device. As shown FIG. 1, the electrochromic device (10) comprises a transparent conductive substrate (A) comprising a transparent substrate (11a), a transparent electrode (12a) and an ultraviolet absorptive layer (13) inserted therebetween; a transparent conductive substrate (B) comprising a transparent substrate (11b), and a transparent electrode (12b), the two conductive substrates (A) and (B) being disposed so that the electrodes thereof face each other; an electrochromic layer (14) formed on the surface of the transparent electrode (12b) facing the transparent electrode (12a); and an ion conductive material inserted between the transparent conductive substrate (A) and the electrochromic layer (14) and sealed with a sealant (15).

The electrochromic device shown in FIG. 2 is different from that in FIG. 1 in that the ultraviolet absorptive layer (16) is formed on the outer surface of the transparent substrate (11a) which is opposite to the surface Having the transparent electrode (12a) instead of being inserted between the transparent substrate (11a) and the transparent electrode (12a) Parts in FIG. 2 through FIG. 10 denoted by the same reference numerals of those in FIG. 1 are omitted from explanation for purposes of brevity.

Figure 3:
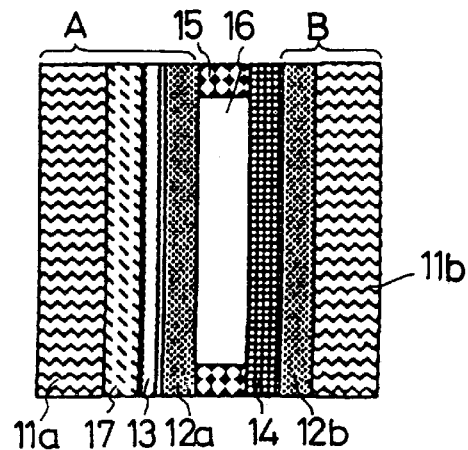
FIG. 3 illustrates the structure of an electrochromic devise according to a third embodiment of the invention.
Figure 4:
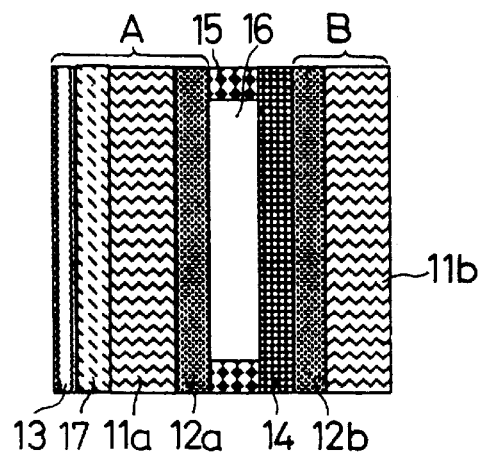
FIG. 4 illustrates the structure of an electrochromic devise according to a forth embodiment of the invention.

As shown FIGS. 3 and 4, there may be provided one or more of an intermediate layer (17) between the transparent substrate (11a) and the ultraviolet absorptive layer (13). There is no particular limitation to the functions of the intermediate layer. Since the ultraviolet absorptive layer of the invention is susceptible to deterioration dependently on the material thereof by infrared rays, there may be provided another ultraviolet absorptive layer as the intermediate layer containing inorganic oxides such as ZnO, $CeO^2$ and $TiO_2$ so as to suppress such deterioration. Alternatively, there may be provided an intermediate layer (7) containing a silane coupling agent or a surface active agent in order to improve the adhesivity between the ultraviolet absorptive layer (13) and the transparent substrate (11a).

Figure 5:
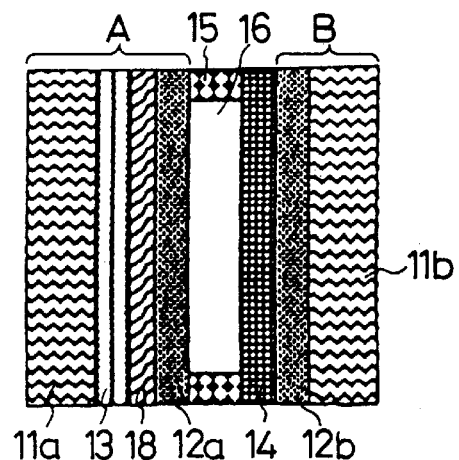
FIG. 5 illustrates the structure of an electrochromic devise according to a fifth embodiment of the invention.
Figure 6:
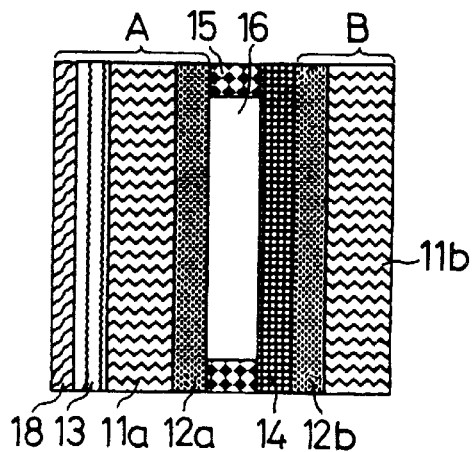
FIG. 6 illustrates the structure of an electrochromic devise according to a sixth embodiment of the invention.

Further alternatively, there may be provided an overcoat layer (18) between the ultraviolet absorptive layer (13) and the transparent substrate (12a) as shown in FIG. 5 or on the surface of the ultraviolet absorptive layer as shown in FIG. 6. There is no particular limitation to the functions of the overcoat layer (18). Exemplarily, the overcoat layer may be provided in order to protect, the ultraviolet absorptive layer from external causes such as friction.

Figure 7:
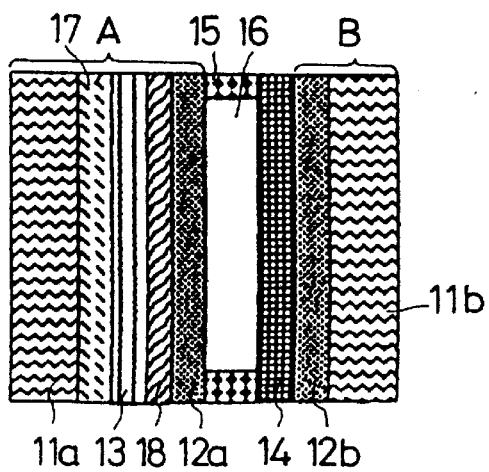
FIG. 7 illustrates the structure of an electrochromic devise according to a seventh embodiment of the invention.
Figure 8:
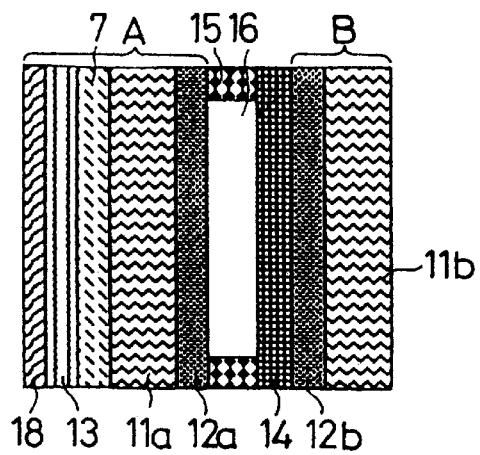
FIG. 8 illustrates the structure of an electrochromic devise according to a eighth embodiment of the invention.

Further alternatively, the inventive electrochromic device (10) have both the intermediate layer (17) and the overcoat layer (18) altogether as shown in FIGS. 7 and 8.

Figure 9:
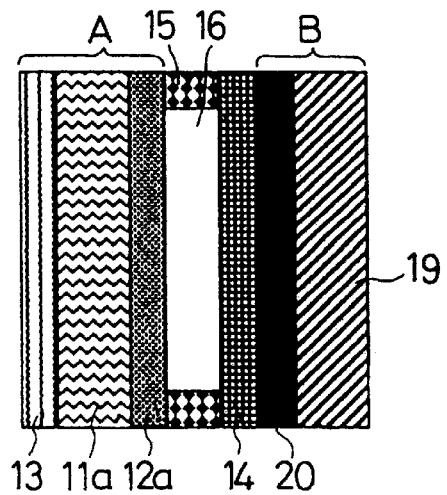
FIG. 9 illustrates the structure of an electrochromic devise according to a ninth embodiment of the invention
Figure 10:
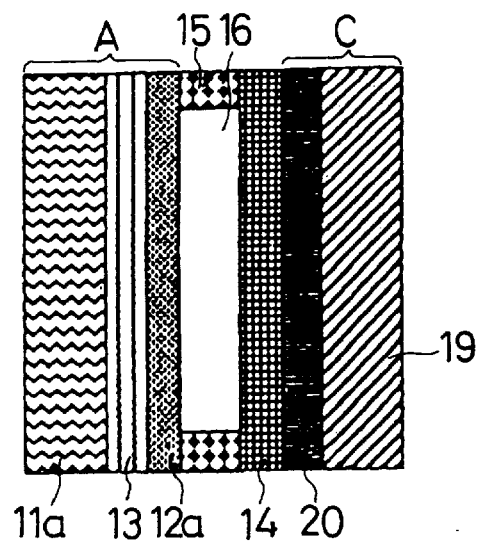
FIG. 10 illustrates the structure of an electrochromic devise according to a tenth embodiment of the invention.

As shown in FIGS. 9 and 10, the inventive electrochromic device may have an opaque conductive substrate (C) comprising an opaque substrate (19) and an opaque electrode (20) in place of the transparent conductive substrate.

There is no particular limitation to the method of forming each of the films and layers constituting the inventive electrochromic device. The films and layers may be produced in accordance with the above-described methods. For instance, in the case of the inventive electrochromic device shown in FIG. 1, the transparent conductive substrate (A) is produced by forming the ultraviolet absorptive layer (13) and then the transparent electrode (12a) on the transparent substrate (11a) in a manner which had already been mentioned. The transparent conductive substrate (B) is then produced by forming the transparent electrode (12b) and the electrochromic layer (14) on the transparent substrate (11b). These transparent conductive substrates (A, B) are arranged to be opposed each other at an interval of the order of 1–1,000 µm and then the periphery of the substrates other than the portion an injecting port is located is sealed with the sealant (15) through which port the ion conductive material (16) is injected thereby producing the electrochromic device according to the invention. Upon the arrangement of the transparent conductive substrates (A, B) in opposed relation, there may be used a spacer which ensures the interval between the substrates (A, B) to be maintained in constant distance. Although not restricted, the spacers may be those in the form of beads or sheets made from glass or polymers. The spacer may be provided by inserting between the two transparent conductive substrates (A, B) opposed each other or by forming protrusions constituted with an insulator such as resin over the electrode on the substrate.

The ion conductive material layer (16) may be formed in a method in which the precursor of the above-mentioned solid ion conductive material is injected between the two transparent conductive substrates opposed each other and then cured. The curing may be carried out by heating, lightening or a method in which immediately before being injected the ion conductive material is mixed with a reactive liquid which cures with the lapse of time.

For another instance, in the case of the electrochromic device shown in FIG. 2, the transparent conductive substrate (A) is produced by forming the transparent electrode (12a) on the transparent substrate (11a) and then the ultraviolet absorptive layer (13) on the surface of the transparent substrate (11a) which surface opposite to the electrode (12a) in a manner above described and vise versa. The transparent conductive substrate (B) is produced by forming the transparent electrode (12b) and the electrochromic layer (14) on the transparent substrate (11b). These transparent conductive substrates (A, B) are arranged in opposed relation at an interval on the order of 1–1,000 µm and the periphery thereof other than a portion where an injection port is located is sealed with the sealant (15) through which port the ion conductive material is injected in the above-described manner thereby producing the inventive electrochromic device.

The electrochromic device in FIG. 3 is produced in a similar manner to that for the device in FIG. 1 except-that the intermediate layer (17) is formed on the transparent substrate (11a).

The electrochromic device in FIG. 4 is produced in a similar manner to that for the device shown in FIG. 2 except that the intermediate layer (17) is formed prior to the formation of the ultraviolet absorptive layer (13).

The electrochromic device shown in FIG. 5 is produced by forming the ultraviolet absorptive layer (13) and then the overcoat layer (17) on the transparent substrate (11a) and thereafter employing the manner similar to that for the device shown in FIG. 1.

The electrochromic device shown in FIG. 6 is produced in a similar manner to that for the device shown in FIG. 2 except that after forming the ultraviolet absorptive layer (13) the overcoat layer (17) is formed.

The electrochromic device shown in FIG. 7 is produced by forming successively the intermediate layer (17), the ultraviolet absorptive layer (18) and thereafter following the procedure for the device shown in FIG. 1.

The electrochromic device shown in FIG. 8 is produced by forming successively the intermediate layer (17), the ultraviolet absorptive layer (18) and thereafter following the procedure for the device shown in FIG. 2.

So far the present invention was described in detail and preferred embodiments thereof are as follows:
1. An electrochromic device produced by reacting at least (a) the above-described aminosilane compound of formula (1) or the derivative thereof and(b) the above-described ultraviolet absorbing material Having carboxyl group in its molecules in the presence of the above-described silicone resin;
2. An electrochromic device produced by reacting at least (a) the above-described aminosilane compound of formula (1) or the derivative thereof and (b) the above-described ultraviolet absorbing material Having carboxyl group in its molecules to obtain a reaction product Having an amide bond derived from the aminosilane compound or the derivative thereof, followed by addition of the above-described epoxysilanes; and
3. An electrochromic device produced by reacting at least (a) the above-described aminosilane compound of formula (1) or the derivative thereof and (b) the above-described ultraviolet absorbing material Having carboxyl group in its molecules to obtain a reaction product Having an amide bond derived from the aminosilane compound or the derivative thereof, followed by addition of the above-described inorganic fine particle dispersions.

The invention will be further described by way of the following examples which however should not be construed in a limiting sense:

EXAMPLE 1

Synthesis of Ultraviolet Absorptive Material Having Carboxyl Group 225 grams (0.46 mol) of octyl 3-(5-chloro-2H-benzotriazole-2-yl)-5-(1,1-dimethylethyl)-4-hydroxy-benzene propanoate acid manufactured by Ciba-Geigy Co. Ltd. under the trade name of TINUVIN 109 were dissolved in 700 ml acetone and added with 600 ml 2N sodium hydroxide solution, followed by stirring at room temperature for 24 hours. The resulting mixture was acidified with 650 ml 2N hydrochloric acid and filtered to obtain an insoluble product, followed by washing it with distilled water until the filtrate being neutralized. The resulting product was dried in vacuum and recrystalized in toluene thereby obtaining 3-(5-chloro-2H-benzotriazole-2-yl)-5-(1,1-dimethylethyl)-4-hydroxy-benzene propanoic acid (Compound I).

Preparation of Ultraviolet Absorptive Layer 3 grams 3-aminopropyltriethoxysilane was dissolved in 35 grams xylene and added gradually with 5 grams Compound (I) while being heated at a temperature of 80C. Upon completion of the addition, the resulting mixture was heated up to a temperature of 130° C. and refluxed for 3 hours. The mixture was then disposed still to cool down and added with 16 grams 3-glycidoxypropyltrimethoxysilane thereby obtaining an ultraviolet absorptive coating liquid.

13C-NMR analysis of the resulting coating liquid revealed that there was a peak of carboxyl at 173 ppm and thus the existence of an amide bond derived from aminosilane.

The coating liquid was spray—coated over a glass substrate and disposed still at room temperature for 20 minutes, followed by heating at-a temperature of 200° C. for 20 minutes thereby obtaining an ultraviolet absorptive glass having an ultraviolet absorptive layer of 17 µm in thickness.

Preparation of Transparent Conductive Substrate Having Ultraviolet Absorptive Layer A silicone resin coating liquid manufactured, by Nihon Unicar under the trade name of APZ-7705 was diluted with twice as much ethanol and sprayed over the ultraviolet absorptive layer, followed by thermal curing at a temperature of 100° C. for 20 minutes after the solvent had been dried out thereby obtaining a protective layer comprising the silicone resin Having a thickness of about 6.5 µm formed over the ultraviolet absorptive layer.

Figure 11:
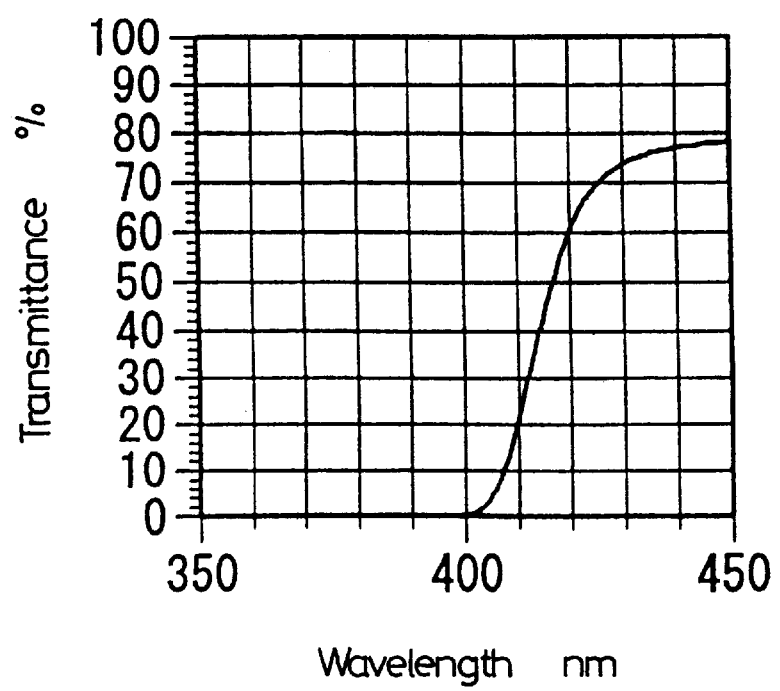
FIG. 11 is a graph showing a spectral transmittance of the transparent substrate produced in Example 1.

There was thus produced the transparent glass substrate having the ultraviolet absorptive layer containing an organic ultraviolet absorbing material and formed over the substrate and the protective layer formed over the ultraviolet absorptive layer. Sputtering with ITO (indium/tin oxide)is conducted at a substrate temperature of 200° C. to form a transparent electrode having a thickness of about 3,900 angstroms and a resistance of 8.2 $\Omega/cm^2$ thereby obtaining a transparent conductive substrate having the capability of intercepting ultraviolet rays. The spectral transmittance of the transparent conductive substrate is shown in FIG. 11.

Preparation of Electrochromic Electrode

On an ITO glass, 10 cm×10 cm in size, $WO_3$ was deposited in vacuum under the condition of 20 to 30

Å/second to have a thickness of 5,000 angstroms thereby preparing an electrochromic electrode.

Preparation of Counterelectrode

On an ITO glass, 10 cm×10 cm in size, fibers of activated carbon manufactured by Gunei Chemical Industry Co. Ltd. Having surface area of 1,500 m²/g were bonded in the form of a grid using an electrically conductive adhesive manufactured by Tokuriki Kagaku Kenkyusho under the trade name of "Silvest P-225". The shape of the grid of the fibers was defined by a grid line interval of 2 cm and a grid line width 0.8 mm. The activated carbon was used in amount of 0.85 mg/cm. A polyester film was then bonded on the activated carbon fibers as an insulating layer thereby obtaining a counterelectrode.

Preparation of Smart Window

The electrochromic electrode was placed facing the counterelectrode thus produced and the periphery of the resulting assembly was sealed with an epoxy resin with a width of 5 mm. A solution of $LiClO_4$ in propylene carbonate (1 M/1) as an electrolytic solution was charged in vacuum into the assembly and an injection port was sealed with epoxy resin. A lead wire was connected to the electrochromic electrode and the counter electrode thereby producing a smart window. The smart window thus produced was evaluated in performances by the following tests.

Coloring and Bleaching

Test An electrical voltage of 1 V was applied across the electrochromic electrode so as to be negative and the counter electrode so as to be positive for 120 seconds. It was observed that the smart window was colored uniformly in blue. The optical density during coloration was 1.08. An electrical voltage of 1 V was then applied across the electrochromic electrode so as to be positive and the counterelectrode so as to be negative for 60 seconds. It was observed that the coloration disappeared quickly. The optical density at this time was 0.20. The difference between the optical density during the state of coloration and that on bleaching was 0.88.

Cyclic Test

The coloring and bleaching tests were repeatedly conducted 1,200 times in a sun tester. There occurred no remnant coloration nor reduction in the response or in the difference in the optical-density and thus the cyclic performances were found to be highly stable.

EXAMPLE 2

Preparation of Ultraviolet Absorptive Layer 9p 3 grams 3-aminopropyltriethoxysilane was dissolved in 40 grams xylene and added gradually with 5 grams Compound (I) while being heated at a temperature of 60° C. Upon completion of the addition, the resulting mixture was heated up to a temperature of 130° C. and refluxed for 3 hours thereby obtaining an ultraviolet absorptive layer.

13C-NMR analysis of the resulting coating liquid revealed that there was a peak of carboxyl at 173 ppm and thus the existence of an amide bond derived from aminosilane. The coating liquid was coated over a glass substrate by spraying and disposed still at room temperature for 20 minutes, followed by heating at a temperature of 130° C. for 30 minutes thereby obtaining an ultraviolet absorber glass having an ultraviolet absorptive layer of 10 μm in thickness.

Preparation of Transparent Conductive Substrate Having Ultraviolet Absorptive Layer A transparent conductive substrate was produced using the ultraviolet absorber glass sheet thus obtained in accordance with the procedure of Example 1. The measurement of spectral transmittance of this transparent substrate that it is capable of intercepting almost completely ultraviolets less than 400 nm.

Preparation of Electrochromic Electrode

An electrochromic electrode was produced by depositing $WO_3$ on an ITO glass, 10 cm×10 cm in size, in accordance with the procedure of Example 1.

Preparation of Counterelectrode

A counterelectrode was produced by arranging activated carbon fibers on the transparent conductive substrate, 10 cm×10 cm in size, having the ultraviolet absorptive layer in accordance with the procedure of Example 1.

Preparation of Smart Window

A smart window was produced using the electrochromic electrode and counterelectrode thus produced in accordance with the procedure of Example 1 and evaluated in performances by the same test as that of Example 1 under the same conditions thereof.

Coloring and Bleaching Test

The smart window thus produced was colored uniformly in blue. It was observed that the smart window was 1.08 in the optical density during coloration, 0.20 in the optical density upon bleaching and 0.88 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 3

Preparation of Ultraviolet Absorptive Layer 17.7 grams silicone varnish manufactured by Okitsumo Co. Ltd. under the trade name of "X0-7931 -Clear" and 3 grams of 3-amrinopropyltriethoxysilane were dissolved in 35 grams xylene and added gradually with 5 grams Component (I) while being heated at a temperature of 80° C. Upon completion of the addition, the resulting mixture was heated up to 130° C. and refluxed for 3 hours thereby obtaining an ultraviolet absorbing solvent- based coating liquid. The coating liquid was spray-coated over a glass substrate and disposed still at room temperature for 20 minutes, followed by heating at a temperature of 200° C. for 20 minutes thereby obtaining an ultraviolet absorber glass having an ultraviolet absorptive layer of 17 μm in thickness. The resulting ultraviolet absorptive layer was subjected to a grid test and revealed that 50 percent of peeling-off occurred. Furthermore, this ultraviolet absorber glass was extracted in boiled acetone for 24 hours. There was observed no weight reduction which showed that the ultraviolet absorbing material was bonded to the resin through aminosilane.

Figure 12:
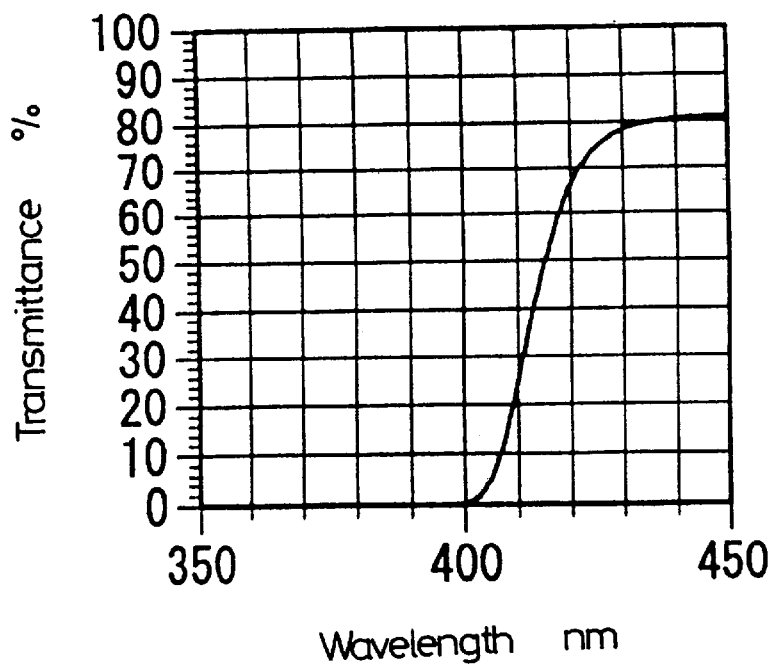
FIG. 12 is a graph showing a spectral transmittance of the transparent substrate produced in Example 3.

Preparation of Transparent Conductive Substrate Having Ultraviolet Absorptive Layer A transparent conductive substrate was produced using the ultraviolet absorber glass sheet thus obtained in accordance with the procedure of Example 1. The resulting transparent conductive substrate had a protective layer comprising the silicone resin having a thickness of about 6.5 μm formed over the ultraviolet absorptive layer and a transparent electrode having a thickness of about 3,900 angstroms and a resistance of 8.2 Ω/cm². The spectral transmittance of the transparent conductive substrate is shown in FIG. 12.

Preparation of Electrochromic Electrode

An electrochromic electrode was produced by depositing $WO_3$ on an ITO glass 10 cm×10 cm in size, in accordance with the procedure of Example 1.

Preparation of Counterelectrode

A counterelectrode was produced by arranging activated carbon fibers on the transparent conductive substrate, 10 cm×10 cm in size, Having the ultraviolet absorptive layer in accordance with the procedure of Example 1.

Preparation of Smart Window

A smart window was produced using the electrochromic electrode and counterelectrode thus produced in accordance with the procedure of Example 1 and evaluated in performances by the same test as that of Example 1 under the same conditions thereof.

Coloring and Bleaching Test

The smart window thus produced was colored uniformly in blue. It was observed that the smart window was 1.1 in the optical density during coloration, 0.21 in the optical density upon bleaching and 0.89 in the difference between the optical density during the state of coloration and that on bleaching.

Cyclic Test

There occurred no remnant coloration nor reduction in the response or in the difference in the optical-density and thus the cyclic performances were found to be highly stable.

EXAMPLE 4

Preparation of Ultraviolet Absorptive Layer 17.7 grams silicone varnish manufactured by Okitsumo Co. Ltd. under the trade name of "X0-7931 -Clear" and 3 grams of 3-aminopropyltriethoxysilane were dissolved in 35 grams xylene and added gradually with 5 grams Component (1) while being heated at a temperature of 80° C. Upon completion of the addition, the resulting mixture was heated up to 130° C. and refluxed for 3 hours. The mixture was then disposed still to cool down and added with 16 grams of 3-glycidoxypropyltrimethoxysilane thereby obtaining an ultraviolet absorptive coating liquid.

The coating liquid was coated over a glass substrate by spraying and disposed still at room temperature for 20 minutes, followed by heating at a temperature of 200° C. for 20 minutes thereby obtaining an ultraviolet absorber glass having an ultraviolet absorptive layer of 17 $\mu$m in thickness. The glass was subjected to a grid test and no peeling-off was observed.

Figure 13:
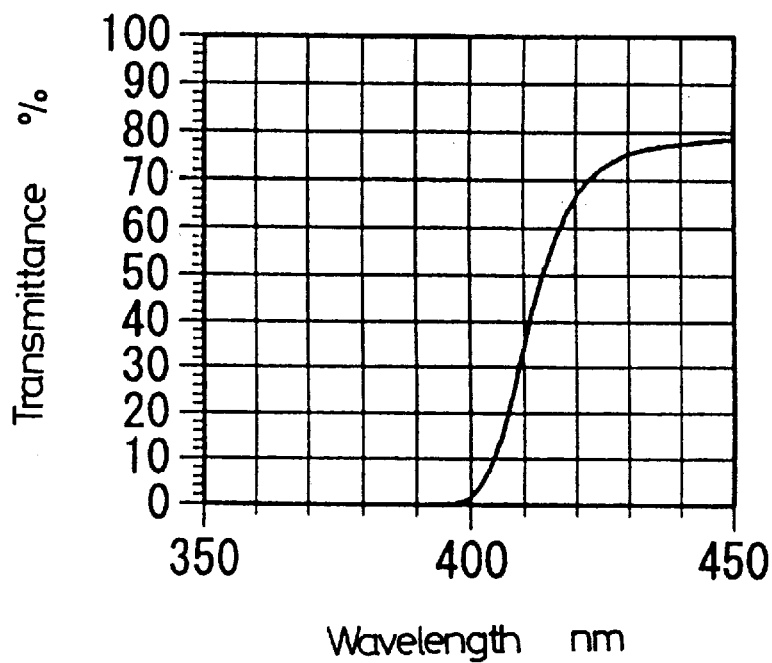
FIG. 13 is a graph showing a spectral transmittance of the transparent substrate produced in Example 4.

Preparation of Transparent Conductive Substrate Having Ultraviolet Absorptive Layer A transparent conductive substrate was produced using the ultraviolet absorber glass sheet thus obtained in accordance with the procedure of Example 1. The resulting transparent conductive substrate had a protective layer comprising the silicone resin having a thickness of about 6.5 Am formed over the ultraviolet absorptive layer and a transparent electrode having a thickness of about 3,900 angstroms and a resistance of 8.2 $\Omega/cm^2$. The spectral transmittance of the transparent conductive substrate is shown in FIG. 13.

Preparation of Electrochromic Electrode

An electrochromic electrode was produced by depositing $WO_3$ On an ITO glass, 10 cm×1 0 cm in size, in accordance with the procedure of Example 1.

Preparation of Counterelectrode

A counterelectrode was produced by arranging activated carbon fibers on the transparent conductive substrate, 10 cm×10 cm in size, having the ultraviolet absorptive layer in accordance with the procedure of Example 1.

Preparation of Smart Window

A smart window was produced using the electrochromic electrode and counterelectrode thus produced in accordance with the procedure of Example 1 and evaluated in performances by the same test as that of Example 1 under the same conditions thereof.

Coloring and Bleaching Test

The smart window thus produced was colored uniformly in blue. It was observed that the smart window was 1.1 in the optical density during coloration, 0.22 in the optical density upon bleaching and 0.89 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 5

Preparation of Ultraviolet Absorptive Layer 17.7 grams silicone varnish manufactured by Okitsumo Co. Ltd. under the trade name of "X0-7931 -Clear" and 3 grams of 3-aminopropyltriethoxysilane were dissolved in 35 grams xylene and added gradually with 5 grams Component (1) while being heated at a temperature of 80° C. Upon completion of the addition, the resulting mixture was heated up to 130° C. and refluxed for 3 hours. The mixture was then disposed still to cool down and added with 16 grams of 3-glycidoxypropyltrimethoxysilane and 8 grams colloidal silica dispersions manufactured by Nissan Kagaku under the trade name of "MIBK-ST" thereby obtaining an ultraviolet absorbing coating liquid.

The coating liquid was coated over a glass substrate and disposed still at room temperature for 20 minutes, followed by heating at a temperature of 200° C. for 20 minutes thereby obtaining an ultraviolet absorber glass having an ultraviolet absorptive layer of 17 $\mu$m in thickness. The resulting glass was subjected to a pencil hardness test and the result there of was 4H.

Figure 14:
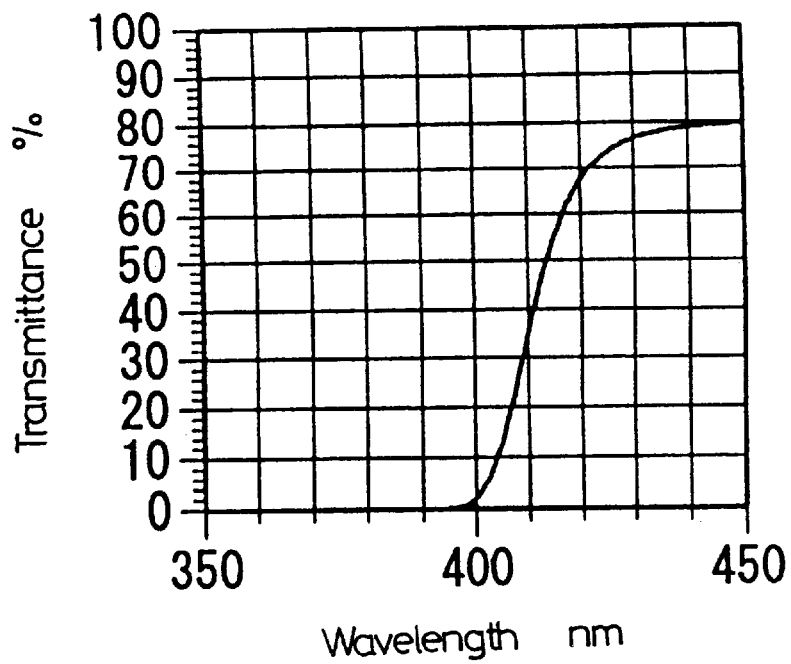
FIG. 14 is a graph showing a spectral transmittance of the transparent substrate produced in Example 5.

Preparation of Transparent Conductive Substrate Having Ultraviolet Absorptive Layer There was thus produced the transparent glass substrate having the ultraviolet absorptive layer containing an organic ultraviolet absorbing material and formed over the substrate and the protective layer formed over the ultraviolet absorptive layer. Sputtering with ITO (indium/tin oxide)is conducted at a substrate temperature of 200° C. to form a transparent electrode having a thickness of about 3,900 angstroms and a resistance of 8.2 $\Omega/cm^2$ thereby obtaining a transparent conductive substrate having the capability of intercepting ultraviolet rays. The spectral transmittance of the transparent conductive substrate is shown in FIG. 14.

Preparation of Electrochromic Electrode

An electrochromic electrode was produced by depositing $WO_3$ on an ITO glass, 10 cm×10 cm in size, in accordance with the procedure of Example 1.

Preparation of Counterelectrode

A counterelectrode was produced by arranging activated carbon fibers on the transparent conductive substrate, 10 cm×10 cm in size, having the ultraviolet absorptive layer in accordance with the procedure of Example 1.

Preparation of Smart Window

A smart window was produced using the electrochromic electrode and counterelectrode thus produced in accordance with the procedure of Example 1 and evaluated in performances by the same test as that of Example 1 under the same conditions thereof.

Coloring and Bleaching-Test

The smart window thus produced was colored uniformly in blue. It was observed that the smart window was 1.09 in the optical density during coloration, 0.20 in the optical density upon bleaching and 0.87 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 6

Polymerization of Epoxysilane 200 grams of 3-glycidoxypropylmethoxysilane was dissolved in 75 grams xylene and added gradually with 4 ml boron trifluoride-diethylether complex at room temperature. The resulting mixture was subjected to ring opening polymerization by stirring for 4 hours. The resulting polymer was 3,300 Mw in molecular weight (polystyrene conversion).

Preparation of Ultraviolet Absorptive Layer 17.7 grams silicone varnish manufactured by Okitsumo Co. Ltd. under the trade name of "X0-7931 -Clear" and 3 grams of 3-aminopropyltriethoxysilane were dissolved in 29 grams xylene and added gradually with 5 grams Component (I) while being heated at a temperature of 80° C. Upon completion of the addition, the resulting mixture was heated up to 130° C. and refluxed for 3 hours. The mixture was then disposed still to cool down and added with 22 grams of the solution of the epoxysilane polymer thereby obtaining an ultraviolet absorptive layer.

The coating liquid was coated over a glass substrate by spraying and disposed still at room temperature for 20 minutes, followed by heating at a temperature of 150° C. for 30 minutes thereby obtaining an ultraviolet absorber glass Having an ultraviolet absorptive layer of 15 μm in thickness. The resulting glass was subjected to a pencil hardness test and the result thereof was 6H.

Preparation of Transparent Conductive Substrate Having Ultraviolet Absorptive Layer A transparent conductive substrate was produced using the ultraviolet absorber glass sheet thus obtained in accordance with the procedure of Example 1.

Figure 15:
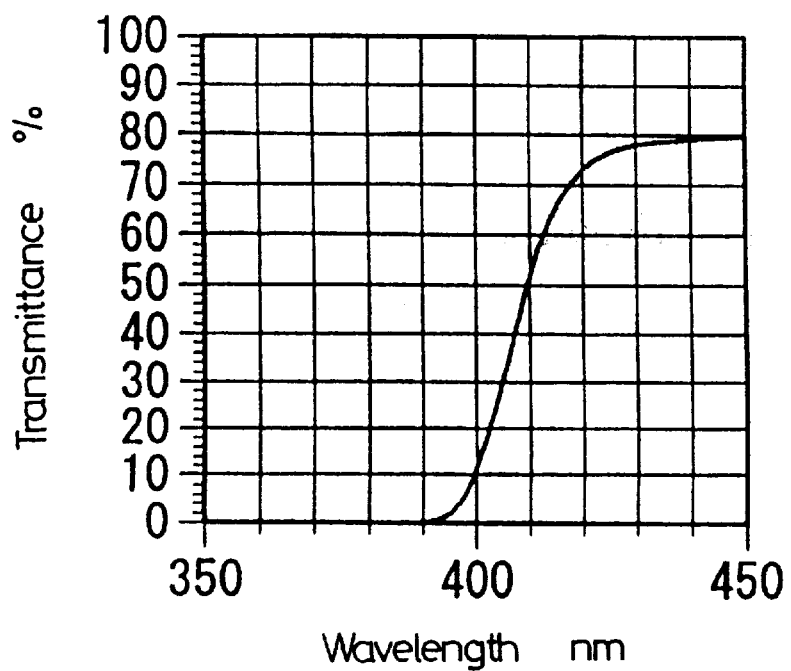
FIG. 15 is a graph showing a spectral transmittance of the transparent substrate produced in Example 6.

The resulting transparent conductive substrate had a protective layer of the resin Having a thickness of 6.5 μm and a transparent electrode Having a thickness of about 3,900 angstroms and a resistance of 8.2 Ω/1 cm². The spectral transmittance of the transparent conductive substrate is shown in FIG. 15.

Preparation of Electrochromic Electrode

An electrochromic electrode was produced by depositing $WO_3$ On an ITO glass, 10 cm×10 cm in size, in accordance with the procedure of Example 1.

Preparation of Counterelectrode

A counterelectrode was produced by arranging activated carbon fibers on the transparent conductive substrate, 10 cm×10 cm in size, having the ultraviolet absorptive layer in accordance with the procedure of Example 1.

Preparation of Smart Window

A smart window was produced using the electrochromic electrode and counterelectrode thus produced in accordance with the procedure of Example 1 and evaluated in performances by the same test as that of Example 1 under the same conditions thereof.

Coloring and Bleaching Test

The smart window thus produced was colored uniformly in blue. It was observed that the smart window was 1.09 in the optical density during coloration, 0.20 in the optical density upon bleaching and 0.89 in the difference between the optical density during the state of coloration and that on bleaching.

Cyclic Test

There occurred no remnant coloration nor reduction in the response or in the difference in the optical-density and thus the cyclic performances were found to be highly stable.

EXAMPLE 7

Preparation of Ultraviolet Absorptive Layer 3 grams of 3-aminopropyttriethoxysilane and 11 grams of the epoxysilane polymer solution used in Example 6 were dissolved in 32 grams xylene and added gradually with 5 grams of Compound (I) while being heated at a temperature of 80° C. Upon completion of the addition, the resulting mixture was heated up to 130° C. and refluxed for 3 hours thereby obtaining an ultraviolet absorptive coating liquid.

The coating liquid was coated over a glass substrate by spraying and disposed still at room temperature for 20 minutes, followed by heating at a temperature of 150° C. for 30 minutes thereby obtaining an ultraviolet absorber glass having an ultraviolet absorptive layer of 15 μm in thickness. The resulting glass was subjected to a pencil hardness test and the result thereof of was 5H.

Figure 16:
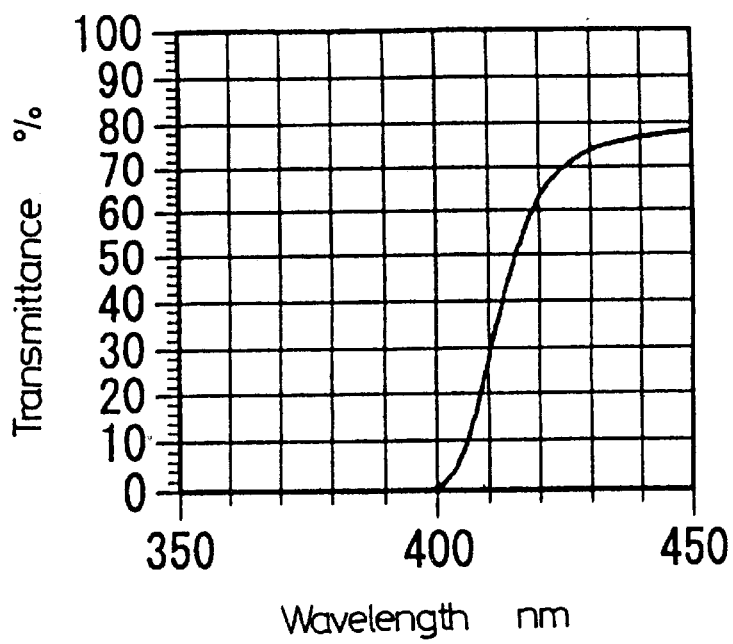
FIG. 16 is a graph showing a spectral transmittance of the transparent substrate produced in Example 7.

Preparation of Transparent Conductive Substrate Having Ultraviolet Absorptive Layer A transparent conductive substrate was produced using the ultraviolet absorber glass sheet thus obtained in accordance with the procedure of Example 1. The resulting transparent conductive substrate had a protective layer of the resin having a thickness of 6.5 μm and a transparent electrode having a thickness of about 3,900 angstroms and a resistance of 8.2 Ω/cm2. The spectral transmittance of the transparent conductive substrate is shown in FIG. 16.

Preparation of Electrochromic Electrode

An electrochromic electrode was produced by depositing $WO_3$ on an ITO glass, 10 cm×10 cm in size, in accordance with the procedure of Example 1.

Preparation of Counterelectrode

A counterelectrode was produced by arranging activated carbon fibers on the transparent conductive substrate, 10 cm×10 cm in size, having the ultraviolet absorptive layer in accordance with the procedure of Example 1.

Preparation of Smart Window

A smart window was produced using the electrochromic electrode and counterelectrode thus produced in accordance with the procedure of Example 1 and evaluated in performances by the same test as that of Example 1 under the same conditions thereof.

Coloring and Bleaching Test

The smart window thus produced was colored uniformly in blue. It was observed that the smart window was 1.08 in the optical density during coloration, 0.21 in the optical density upon bleaching and 0.87 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 8

Preparation of Electrochromic Electrode An electrochromic electrode was produced by depositing $WO_3$ on an ITO glass, 10 cm×10 cm in size, in accordance with the procedure of Example 1.

Preparation of Counterelectrode

Fibers of activated carbon fibers were arranged on the transparent conductive substrate prepared in Example 7, 10 cm×10 cm in size, in accordance with the procedure of Example 1 thereby obtaining an counterelectrode.

Preparation of Precursor of Solid ion Conductive Material 1 gram methoxypolyethylene glycol #230 methacrylate, 0.02 gram polyethylene glycol #400 dimethacrylate both of which are manufactured by Shin Nakamura Kagaku Co. Ltd under the trade names of "M 40G" and "9G" respectively, and 20 milligrams photopolymerization initiator manufactured by Ciba-Geigy Co. Ltd. under the trade name of "Darocur 1173" were dissolved in 4 grams of 1 M-LiClO$_4$/ r-butyrolactone solution thereby obtaining a solid ion conductive material precursor.

Preparation of Smart Window

The electrochromic electrode was placed facing the counterelectrode with glass beads of 200 μm in particle diameter inserted therebetween and the periphery of the resulting assembly were sealed with an epoxy resin sealant with a width of 5 mm. The solid conductive precursor was charged in vacuum into the inside of the assembly and cured by radiation of ultraviolet, followed by sealing an injection port with epoxy resin.

The resulting smart window was evaluated in performances by the same test as that of Example 1 under the same conditions thereof.

Coloring and Bleaching Test

The smart window thus produced was colored uniformly in blue. It was observed that the smart window was 1.15 in the optical density during coloration, 0.25 in the optical density upon bleaching and 0.90 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 9

Preparation of Intermediate Layer

Ultrafine particle dispersion coatings of ZnO manufactured by Resino Color Industry under the trade name of "UV-S-400" were dip-coated to a glass substrate and cured by heating at a temperature of 200° C. for 20 minutes thereby obtaining an ultraviolet absorptive layer of about 2 μm in thickness. Over the resulting layer, a methylene chloride solution of polyether sulfone manufactured by ICI Co. Ltd. under the trade name of "VICTREX PES 4100P" was spin-coated thereby obtaining a polymer layer of 2 μm in thickness.

Preparation of Ultraviolet Absorptive Layer

In accordance with the procedure of Example 7, there was produced an ultraviolet absorptive layer of 15 μm in thickness over the resulting polymer layer.

Preparation of Overcoat Layer

Over the resulting ultraviolet absorptive layer, polyimide-varnish manufactured by Nissan Kagaku Industry Co. Ltd. under the trade name of RN-812 was spin-coated and the solvent thereof was dried out by heating at a temperature of 60° C. on a hot plate, followed by curing in an oven at a temperature of 200° C. for 30 minutes thereby obtaining an overcoat layer having a thickness of 2μm.

Preparation of Transparent Conductive Membrane

Over the overcoat layer, sputtering using ITO was carried out at a substrate temperature of less than 250° C. thereby obtaining a transparent conductive substrate having a transparent conductive membrane of 2,050 angstrom in thickness and 9.5 $\Omega/cm^2$ in surface resistance, which substrate is capable of blocking ultraviolet rays.

Preparation of Electrochromic Electrode

Using the transparent conductive substrate thus produced, 10 cm×10 cm in size, electrolytic polymerization was conducted in a solution of 0.5 mol/l aniline hydrochloride and 0.5 mol/l perchloric acid at a current density of 500 μAcm thereby obtaining a polyaniline membrane having an area of polymerization of 70 $cm^2$ and a thickness of 3,000 angstrom.

Preparation of Counterelectrode

On an ITO glass, 10 cm×10 cm in size, polypyrrole powders with a surface area of 73 m2/g produced by electrolyte polymerization were bonded in the form of lateral stripes, using the same electrically conductive adhesive as that used in Example 1. The stripe line interval and stripe line width were 1 cm and 0.5 mm respectively while the polypyrrole powders were used in an amount of 65 mg/cm. A polyesterfilm was then bonded as an insulating film on the polypyrrole layer thereby obtaining a counterelectrode.

Preparation of Precursor of Ion Conductive Gel 1.0 grams methoxytetraethylene glycol methacrylate was admixed with 40 grams r-butyrolactone and 4 grams lithium perchioric acid and then added with 0.2 gram photopolymerization initiator "Darocure-1173" manufactured by Ciba-Geigy Co, Ltd. under glare protection.

Preparation of Smart Window

The procedure of Example 8.was followed except that the ion conductive gel precursor was charged instead of the solid ion conductive material precursor. The resulting smart window was evaluated in performances by the same test as that of Example 1 under the same conditions thereof.

Coloring and Bleaching Test

The smart window thus produced was colored uniformly in blue. It was observed that the smart window was 0.65 in the optical density during coloration, 0.20 in the optical density upon bleaching and 0.45 in the difference between the optical density during the state of coloration and that on bleaching.

Cyclic Test

There occurred no remnant coloration nor reduction in the response or in the difference in the optical density and thus the cyclic performances were found to be highly stable.

Comparative Example 1

Preparation of Electrochromic Electrode

An electrochromic electrode was produced by depositing $WO_3$ on an ITO glass, 10 cm×10 cm in size in accordance with the procedure of Example 1.

Preparation of Counterelectrode

A counterelectrode was produced by arranging fibers of activated carbon fibers in accordance with the procedure of Example 2 thereby obtaining an counterelectrode.

Preparation of Smart Window

A smart window was produced using the electrochromic electrode and counterelectrode thus obtained by charging electrolyte in vacuum in accordance with the procedure of Example 1.

The resulting smart window was evaluated in performances by the same test as that of Example 1 under the same conditions thereof.

Coloring and Bleaching Test

The smart window thus produced was colored uniformly in blue. It was observed that the smart window was 1.08 in the optical density, during coloration, 0.20 in the optical density upon bleaching and 0.88 in the difference between the optical density during the state of coloration and that on bleaching.

Cyclic Test

There were observed remnant coloration, reduction in the response and a decrease in the difference in the optical density to 0.25.

Comparative Example 2

Preparation of Inorganic Ultraviolet Absorptive Layer

Ultrafine dispersion coatings of ZnO manufactured by Resino Color Industry Co. Ltd under the trade name of "UV S-400" was dip-coated over a glass substrate and cured at a temperature of 200° C. for 20 minutes thereby obtaining an ultraviolet absorptive layer having a thickness of about 2 μm.

Preparation of Transparent Conductive Membrane

Figure 17:
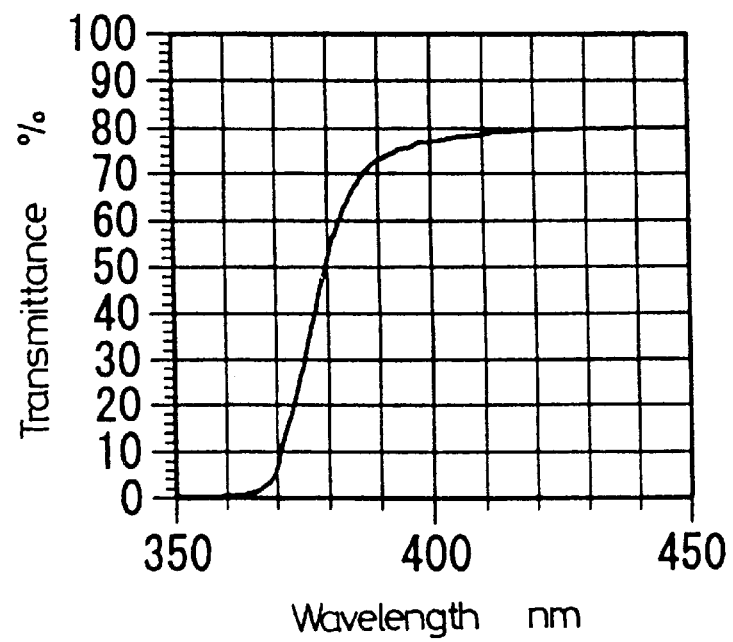
FIG. 17 is a graph showing a spectral transmittance of the transparent substrate produced in Comparative Example 2.

The ultraviolet absorptive layer was sputtered using ITO at a temperature of less than 250° C. thereby obtaining a transparent conductive substrate having an ultraviolet absorptive layer of 2,050 angstrom and 9.5 Ω/cm² of surface resistance which substrate is capable of blocking ultraviolet rays. The spectral transmittance of the transparent conductive substrate is shown in FIG. 17.

Preparation of Electrochromic Electrode

An electrochromic electrode was produced by depositing $WO_3$ in accordance with the procedure of Example 1.

Preparation of Counterelectrode

A counterelectrode was produced by arranging fibers of activated carbon fibers in accordance with the procedure of Example 2 thereby obtaining an counterelectrode.

Preparation of Smart Window

A smart window was produced using the electrochromic electrode and counterelectrode thus obtained by charging the precursor of ion conductive gel in vacuum in accordance with the procedure of Example 8.

The resulting smart window was evaluated in performances by the same test as that of Example 1 under the same conditions thereof.

Coloring and Bleaching Test

The smart window thus produced was colored uniformly in blue. It was observed that the smart window was 1.15 in the optical density during coloration, 0.25 in the optical density upon bleaching and 0.90 in the difference between the optical density during the state of coloration and that on bleaching.

Cyclic Test

There were observed remnant coloration, a reduction in the reduction in the response and a decrease in the difference in the optical density to 0.65

EXAMPLE 10

Preparation of Ultraviolet Absorptive Layer

The procedure of Example 1 was followed except that the ultraviolet absorptive layer was sprayed over the surface of an ITO transparent conductive glass substrate of 10 Ω/cm² in resistance which surface is opposite to the conductive membrane thereby obtaining a transparent conductive glass substrate having an ultraviolet absorptive layer of 17 μm in thickness.

Figure 18:
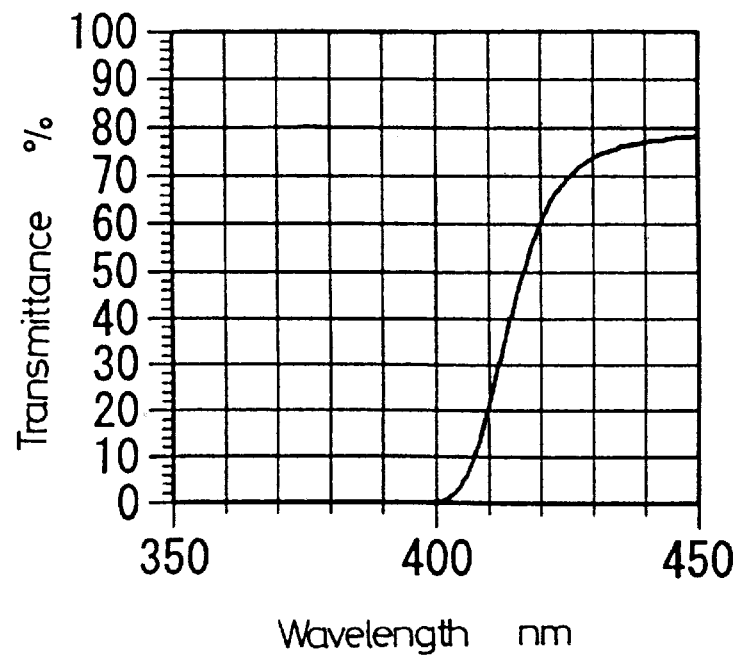
FIG. 18 is a graph showing a spectral transmittance of the transparent substrate produced in Example 10.
Figure 19:
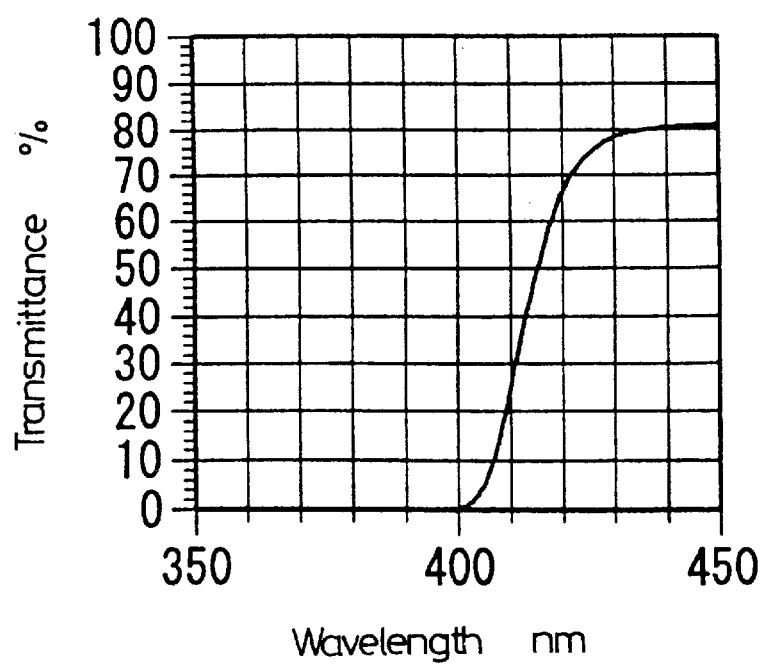
FIG. 19 is a graph showing a spectral transmittance of the transparent substrate produced in Example 12.
Figure 20:
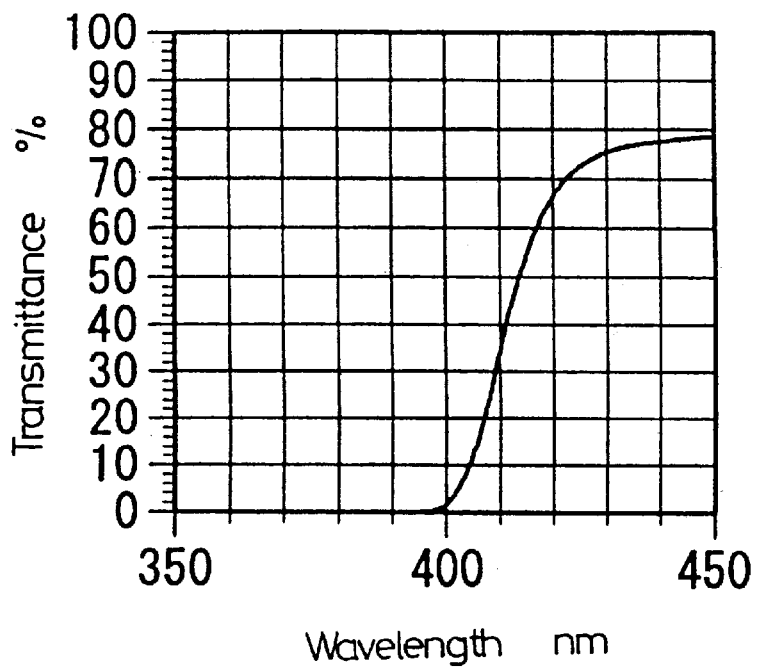
FIG. 20 is a graph showing a spectral transmittance of the transparent substrate produced in Example 13.

The spectral transmittance of the resulting transparent conductive glass substrate is shown in FIG. 18.

Preparation of Electrochromic Electrode

An electrochromic electrode was produced in accordance with the procedure of Example 1.

Preparation of Counterelectrode

A counterelectrode was produced using the transparent conductive glass substrate thus produced in accordance with the procedure of Example 1.

Preparation of Smart Window

A smart window was produced in accordance with the procedure of Example 1 and evaluated in performances by the same test as those conducted in Example 1.

Coloring and Bleaching Test

The smart window thus produced was colored uniformly in blue. It was observed that the smart window was 1.08 in the optical density during coloration, 0.20 in the optical density upon bleaching and 0.88 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 11

Preparation of Ultraviolet Absorptive Layer

The procedure of Example 2 was followed except that the coating liquid was sprayed over the surface of an ITO transparent conductive glass substrate of 10 Ω/1 cm² in resistance which surface is opposite to the conductive membrane thereby obtaining a transparent conductive glass substrate having an ultraviolet absorptive layer of 10 μm. The measurement of spectral transmittance of the resulting glass substrate revealed that it can intercept almost completely ultraviolet rays of less than 400 nm.

Preparation of Electrochromic Electrode

An electrochromic electrode was produced in accordance with the procedure of Example 1.

Preparation of Counterelectrode

A counterelectrode was produced in accordance with the procedure of Example 1.

Preparation of Smart Window

A smart window was produced in accordance with the procedure of Example 1 and evaluated in performances by the same test as those conducted in Example 1.

Coloring and Bleaching Test

The smart window thus produced was colored uniformly in blue. It was observed that the smart window was 1.08 in the optical density during coloration, 0.20 in the optical density upon bleaching and 0.88 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 12

Preparation of Ultraviolet Absorptive Layer

The procedure of Example 3 was followed except that the coating liquid was sprayed on the surface of an ITO transparent conductive glass substrate of 10 Ω/cm² in resistance which surface is opposite to the conductive membrane thereby obtaining a transparent conductive glass substrate of 17 μm.

The resulting transparent conductive glass substrate was subjected to a grid test and 50% peeling-off was observed.

Furthermore, the transparent conductive glass sheet was extracted in boiled acetone for 24 hours. There was observed no weight reduction which fact shows that the ultraviolet absorber material was bonded to the resin through the aminosilane.

Preparation of Electrochromic Electrode

An electrochromic electrode was produced in accordance with the procedure of Example 1.

Preparation of Counterelectrode

A counterelectrode was produced in accordance with the procedure of Example 1.

Preparation of Smart Window

A smart window was produced in accordance with the procedure of Example 1 and evaluated in performances by the same test as those conducted in Example 1.

Coloring and Bleaching Test

The smart window thus produced was colored uniformly in blue. It was observed that the smart window was 1.1 in the optical density during coloration, 0.21 in the optical density upon bleaching and 0.89 in the difference between the optical density during the state of coloration and that on bleaching.

Cyclic Test

There occurred no remnant coloration nor reduction in the response or in the difference in the optical density and thus the cyclic performances were found to be highly stable.

Example 13.

Preparation of Ultraviolet Absorptive Layer

The procedure of Example 4 was followed except that the coating liquid was sprayed on the surface of an ITO transparent conductive glass substrate of 1.0 $\Omega/cm^2$ in resistance which surface is opposite to the conductive membrane thereby obtaining a transparent conductive glass substrate of 17 μm.

The resulting transparent conductive glass substrate was subjected to a grid test and no peeling-off was observed.

Preparation of Electrochromic Electrode

An electrochromic electrode was produced in accordance with the procedure of Example 1.

Preparation of Counterelectrode

A counterelectrode was produced in accordance with the procedure of Example 1.

Preparation of Smart Window

A smart window was produced in accordance with the procedure of Example 1 and evaluated in performances by the same test as those conducted in Example 1.

Coloring and Bleaching Test

The smart window thus produced was colored uniformly in blue. It was observed that the smart window was 1.1 in the optical density during coloration, 0.22 in the optical density upon bleaching and 0.89 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 14

Preparation of Ultraviolet Absorptive Layer

Figure 21:
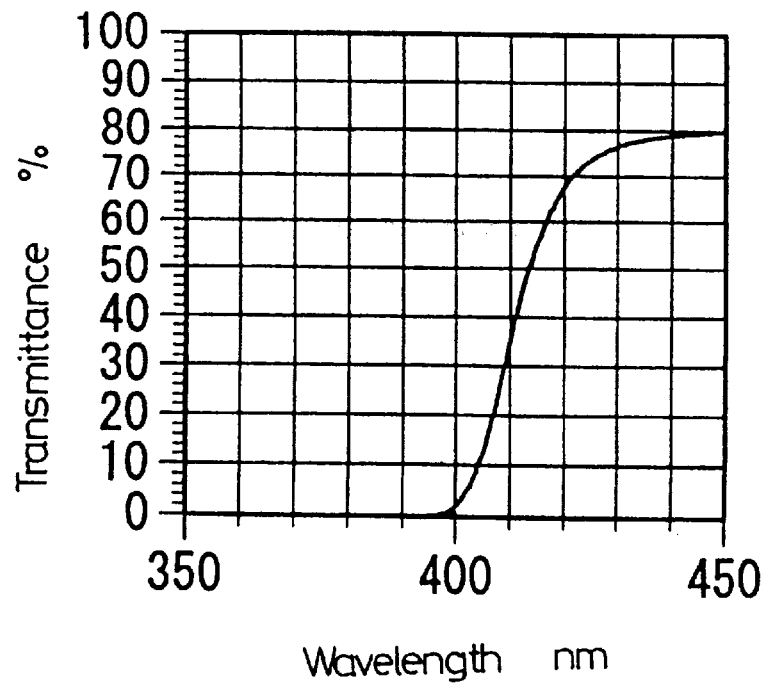
FIG. 21 is a graph showing a spectral transmittance of the transparent substrate produced in Example 14.

The procedure of Example 5 was followed except that the coating liquid was sprayed over the surface of an ITO transparent conductive glass substrate of 10 $\Omega/cm^2$ in resistance which surface is opposite to the conductive membrane thereby obtaining a transparent conductive glass substrate having an ultraviolet absorptive layer of 17 μm in thickness. The resulting glass substrate was subjected to a pencil hardness test and the result thereof was 4H. The spectral transmittance of the glass substrate is shown in FIG. 21.

Preparation of Electrochromic Electrode

An electrochromic electrode was produced in accordance with the procedure of Example 1.

Preparation of Counterelectrode

A counterelectrode was produced in accordance with the procedure of Example 1.

Preparation of Smart Window

A smart window was produced in accordance with the procedure of Example 1 and evaluated in performances by the same test as those conducted in Example 1.

Coloring and Bleaching Test

The smart window thus produced was colored uniformly in blue. It was observed that the smart window was 1.09 in the optical density during coloration, 0.20 in the optical density upon bleaching and 0.87 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 15

Polymerization of Epoxsilane

There was obtained the same polymer as that of in Example 6 by ring opening polymerization conducted in accordance with the procedure of Example 6.

Preparation of Ultraviolet Absorptive Layer

The procedure of Example 6 was followed except that the coating liquid was sprayed over the surface of an ITO transparent conductive glass substrate of 10 $\Omega/cm^2$ in resistance which surface is opposite to the conductive membrane thereby obtaining a transparent conductive glass substrate having an ultraviolet absorptive layer of 15 μm in thickness. The resulting glass substrate was subjected to a pencil hardness test and the result thereof was 6H. "N-L710" manufactured by Tohnen was dip-coated over the ultraviolet absorptive layer of the glass substrate and disposed still at room temperature for 20 minutes followed by calcination at a temperature of 200° C. for one hour and then curing in the atmosphere of 95° C. and 80% RH thereby obtaining an overcoat layer having a thickness of 1 μm.

Figure 22:
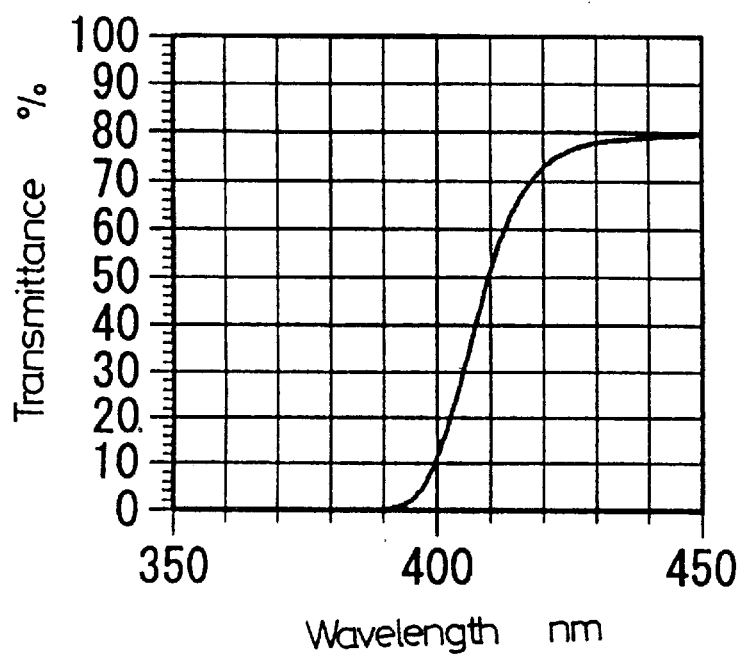
FIG. 22 is a graph showing a spectral transmittance of the transparent substrate produced in Example 15.

The ultraviolet absorptive layer coated with the overcoat layer was subjected to a pencil hardness test and Taber abrasion test and the results thereof were 9H and 7–8% in ΔH respectively. The spectral transmittance of the conductive substrate is shown in FIG. 22.

Preparation of Electrochromic Electrode

An electrochromic electrode was produced in accordance with the procedure of Example 1.

Preparation of Counterelectrode

A counterelectrode was produced in accordance with the procedure of Example 1.

Preparation of Smart Window

A smart window was produced in accordance with the procedure of Example 1 and evaluated in performances by the same test as those conducted in Example 1.

Coloring and Bleaching Test

The smart window thus produced was colored uniformly in blue. It was observed that the smart window was 1.09 in the optical density during coloration, 0.20 in the optical density upon bleaching and 0.89 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 16

Preparation of Ultraviolet Absorptive Layer

The procedure of Example 7 was followed except that the coating liquid was sprayed on the surface of an ITO transparent conductive glass substrate of 10 $\Omega/cm^2$ in resistance which surface is opposite to the conductive membrane thereby obtaining a transparent conductive glass substrate having an ultraviolet absorptive layer of 15 μm in thickness. The resulting glass substrate was subjected to a pencil hardness test and the result thereof was 5H. "Toss Guard 510" manufactured by Toshiba Silicone was spray coated over the ultraviolet absorptive layer of the glass substrate and disposed still at room temperature for 20 minutes, followed by heating at a temperature of 140° C. for 30 minutes thereby obtaining an overcoat layer having a thickness of 4–5 μm.

Figure 23:
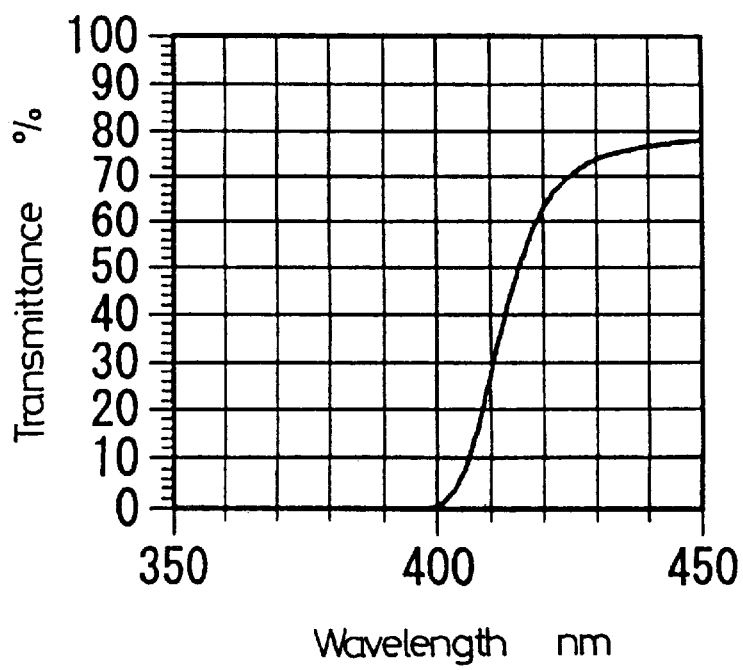
FIG. 23 is a graph showing a spectral transmittance of the transparent substrate produced in Example 16.

The ultraviolet absorptive layer coated with the overcoat layer was subjected to a pencil hardness test and Taber abrasion test and the results thereof were 7–8H and 8–10% in ΔH. The spectral transmittance of the conductive substrate is shown in FIG. 23.

Preparation of Electrochromic Electrode

An electrochromic electrode was produced in accordance with the procedure of Example 1.

Preparation of Counterelectrode

A counterelectrode was produced in accordance with the procedure of Example 1.

Preparation of Smart Window

A smart window was produced in accordance with the procedure of Example 1 and evaluated in performances by the same test as those conducted in Example 1.

Coloring and Bleaching Test

The smart window thus produced was colored uniformly in blue. It was observed that the smart window was 1.08 in the optical density during coloration, 0.21 in the optical density upon bleaching and 0.87 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 17

Preparation of Electrochromic Electrode

An electrochromic electrode was produced by depositing $WO_3$ on an ITO glass, 10 cm×1 0 cm in size, in accordance with the procedure of Example 1.

Preparation of Counterelectrode

Fibers of activated carbon fibers were arranged on the transparent conductive substrate prepared in Example 16, 10 cm×10 cm in size, in accordance with the procedure of Example 1 thereby obtaining an counterelectrode.

Preparation of Precursor of Solid Ion Conductive Material

A precursor of an ion conductive material was produced in accordance with the procedure of Example 8.

Preparation of Smart Window

The electrochromic electrode was placed facing the counterelectrode with glass beads of 200 μm in particle diameter inserted therebetween and the periphery of the resulting assembly were sealed with an epoxy resin sealant with a width of 5 mm. The solid conductive precursor was charged in vacuum into the inside of the assembly and cured by radiation of ultraviolet, followed by sealing an injection port with epoxy resin. The resulting smart window was evaluated in performances by the same test as that of Example 1 under the same conditions thereof.

Coloring and Bleaching Test

The smart window thus produced was colored uniformly in blue. It was observed that the smart window was 1.15 in the optical density during coloration, 0.25 in the optical density upon bleaching and 0.90 in the difference between the optical density during the state of coloration and that on bleaching.

Cyclic Test

There occurred no remnant coloration nor reduction in the response or in the difference in the optical density and thus the cyclic performances were found to be highly stable.

EXAMPLE 18

Preparation of Intermediate Layer

Ultrafine particle dispersion coatings of ZnO manufactured by Resino Color Industry under the trade name of "UV-S-400" were dip-coated over the surface of a transparent ITO glass substrate of 10 Ω/cm²2 opposite to an electrode and cured by heating at a temperature of 200° C. for 20 minutes thereby obtaining an ultraviolet absorptive layer of about 2 μm in thickness. Over the resulting layer, a methylene chloride solution of polyether sulfone manufactured by ICI Co. Ltd. under the trade name of "VICTREX PES 4100P" was spin-coated thereby obtaining a polymer layer of 2 μm in thickness.

Preparation of Ultraviolet Absorptive Layer

In accordance with the procedure of Example 16 there was produced an ultraviolet absorptive layer having a thickness of 15 μm over the polymer layer thus obtained.

Preparation of Overcoat Layer

In accordance with the procedure of Example 16, there was produced an overcoat layer of 2 μm in thickness over the resulting absorptive layer.

Preparation of Electrochromic Electrode

In accordance with the procedure of Example 9, there was conducted electrolyte polymerization thereby obtaining a polyaniline membrane of 70 cm² in area of polymerization and of 3,000 angstrom.

Preparation of Counterelectrode

In accordance with the procedure of Example 9, there was produced a counterelectrode.

Preparation of Precursor of Ion Conductive Gel Precursor

In accordance with the procedure of Example 9, there was obtained, an ion conductive gel precursor.

Preparation of Smart Window

A smart window was prepared using the precursor of ion conductive gel thus produced in accordance with the procedure of Example 17.

The resulting smart window was evaluated in performances by the same test as that of Example 1 under the same conditions thereof.

Coloring and Bleaching Test

The smart window thus produced was colored uniformly in blue. It was observed that the smart window was 0.65 in the optical density during coloration, 0.20 in the optical density upon bleaching and 0.45 in the difference between the optical density during the state of coloration and that on bleaching.

Cyclic Test

There occurred no remnant coloration nor reduction in the response or in the difference in the optical density and thus the cyclic performances were found to be highly stable.

Comparative Example 3

Preparation of Electrochromic Electrode

An electrochromic electrode was produced by depositing $WO_3$ on an ITO glass, 10 cm×10 cm in size, in accordance with the procedure of Example 1.

Preparation of Counterelectrode

A counterelectrode was produced by arranging fibers of activated carbon fibers in accordance with the procedure of Example 11 thereby obtaining an counterelectrode.

Preparation of Smart Window

A smart window was produced using the electrochromic electrode and counterelectrode thus obtained by charging electrolyte in vacuum in accordance with the procedure of Example 11.

The resulting smart window was evaluated in performances by the same test as that of Example 1 under the same conditions thereof.

Coloring and Bleaching-Test

The smart window thus produced was colored uniformly in blue. It was observed that the smart window was 1.08 in the optical density during coloration, 0.20 in the optical density upon bleaching and 0.88 in the difference between the optical density during the state of coloration and that on bleaching.

Cyclic Test

There were observed remnant coloration, a reduction in the reduction in the response and a decrease in the difference in the optical density to 0.25.

Comparative Example 4

Preparation of Inorganic Ultraviolet Absorptive Layer

Figure 24:
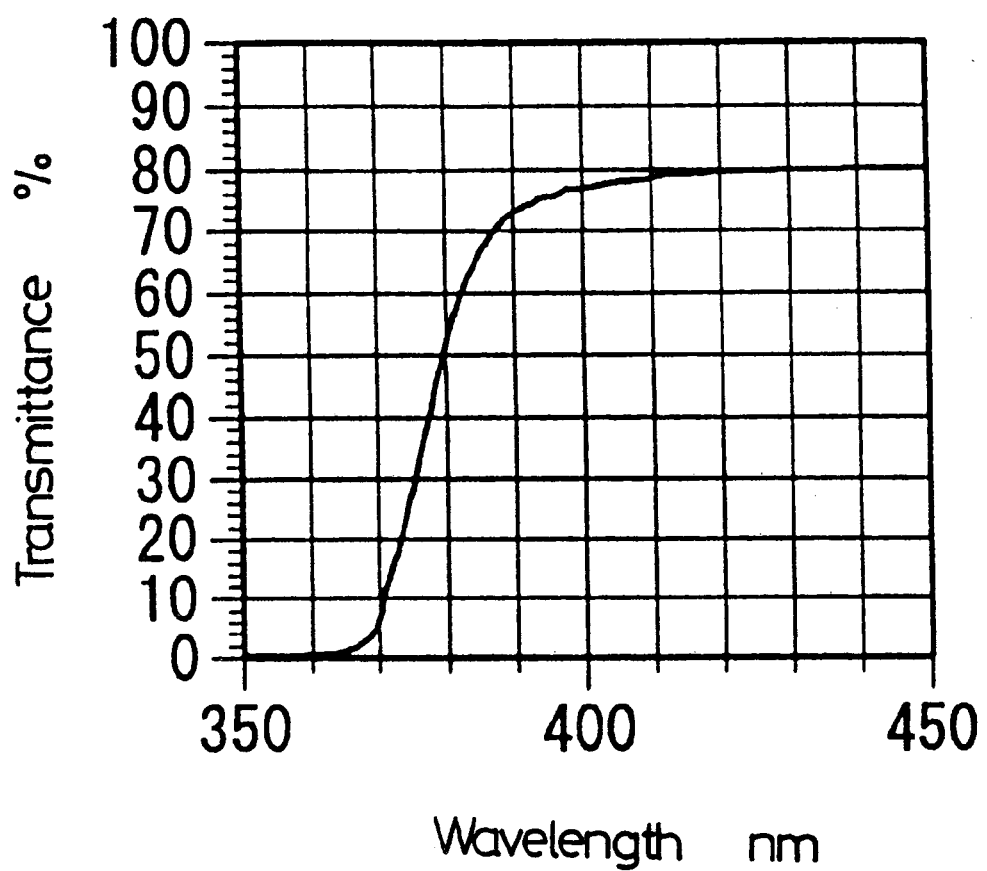
FIG. 24 is a graph showing a spectral transmittance of the transparent substrate produced in Comparative Example 4.

Ultrafine dispersion coatings of ZnO manufactured by Resino Color Industry Co. Ltd. under the trade name of "UV-S-400" was dip-coated over a transparent conductive ITO glass of 10 Ω/cm² opposite to an electrode and cured at a temperature of 200° C. for 20 minutes thereby obtaining an ultraviolet absorptive layer having a thickness of about 2 μm. The spectral transmittance of the transparent conductive substrate is shown in FIG. 24.

Preparation of Electrochromic Electrode

An electrochromic electrode was produced by depositing $WO_3$ in accordance with the procedure of Example 1.

Preparation of Counterelectrode

A counterelectrode was produced by arranging fibers of activated carbon fibers in accordance with the procedure of Example 1 thereby obtaining an counterelectrode.

Preparation of Smart Window

A smart window was produced using the electrochromic electrode and counterelectrode thus obtained by charging the precursor of ion conductive gel in vacuum in accordance with the procedure of Example 17.

The resulting smart window was evaluated in performances by the same test as that of Example 1 under the same conditions thereof.

Coloring and Bleaching Test

The smart window thus produced was colored uniformly in blue. It was observed that the smart window was 1.15 in the optical density during coloration, 0.25 in the optical density upon bleaching and 0.90 in the difference between the optical density during the state of coloration and that on bleaching.

Cyclic Test

There were observed remnant coloration, a reduction in the response and a decrease in the difference in the optical density to 0.65.

The inventive electrochromic device has an ultraviolet absorptive layer between a transparent substrate and transparent electrode or on the surface of a transparent substrate which surface is opposite to the electrode formed thereon and thus is highly durable for outdoor use and resistible to ultraviolet rays. Furthermore, owing that an ultraviolet absorptive material contained in the ultraviolet absorptive layer are chemically bonded to the matrix, the electrochromic device of the invention are free of the deposition of the ultraviolet absorptive material even though it is contained in high concentration in order to intercept ultraviolet rays in longer wavelength, leading to the prolonged service life of the device. The ultraviolet absorptive layer is not only enhanced in adhesiveness to the substrates and hardness and excelled in durability but also contributive in widening the variety of preparation methods of an electrochromic device. Suitable selection of the ultraviolet absorptive layer leads to the success of interception of ultraviolet rays of longer wavelength less than 400 nm. Alternatively, the use of an overcoat layer to be disposed over the ultraviolet absorptive layer leads to the electrochromic device excelled in resistance to abrasion. The inventive device can protect a device incorporating the same from ultraviolet rays and thus can be utilized in windows for outdoor or indoor, skylightings, windows for houses equipped with solar system, windshields of automobiles or other vehicles, sun-roofs and partitions.

What is claimed is:

1. An electrochromic device comprising a pair of electrically conductive substrates disposed facing each other and each having at least on its inner surface an electrode at least one of said electrically conductive substrates comprising a transparent substrate and a transparent electrode, an ion conductive material inserted between said pair of electrically conductive substrates, an electrochromic material-containing layer disposed between either one of said electrodes and said ion conductive material and an ultraviolet absorptive layer disposed between either at least one of said transparent substrates and the electrode disposed thereover or on the surface of said transparent substrate opposite to the transparent electrode disposed thereover, said ultraviolet absorptive layer being formed by coating and curing on the surface of said transparent substrate a reaction product of (A) an aminosilane compound of the formula (I) or the derivative thereof, (B) an ultraviolet absorptive material having in its molecules a carboxyl group and (D) an epoxysilane compound, a ring opening polymerization product thereof, or combinations thereof, said formula(I) being represented by

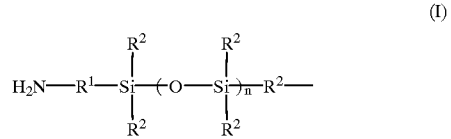

wherein $R^1$ is a $C_1$–$C_{10}$ alkylene group or a divalent group of the formula —$(CH_2)_m$—NH— in which m is an integer of 1–4, the groups $R^2$ are the same or different and each selected from the group consisting of a hydrogen atom, a hydroxyl group, a halogen atom, a $C_1$–$C_{10}$ alkyl group, a $C_1$–$C_{10}$ alkoxy group and a $C_6$–$C_{10}$ aryl group provided that at least one of the groups $R^2$ is an alkoxy group or a hydroxyl group and n is an integer of 0 or greater;

said reaction product having amide bonds derived from said aminosilane compound or the derivative thereof.

2. An electrochromic device according to claim 1 further comprising an intermediate layer disposed between said transparent substrate and said ultraviolet absorptive layer.

3. An electrochromic device according to claim 1 further comprising an overcoat layer disposed over said ultraviolet absorptive layer.

4. An electrochromic device according to claim 1 wherein said electrode has a thickness of ranging from 100 to 5,000 angstroms and resistance ranging from 0.5 to 500 Ω/cm².

5. An electrochromic device according to claim 1 wherein said ion conductive material has an ion conductivity of $1 \times 10^{-7}$ S/cm.

6. An electrochromic device according to claim 1 wherein said ion conductive material is selected from the group consisting of polyethyleneoxide, polymer of oxyethylenemethacrylate, nafion, polystyrene sulfonate, $Li_3N$, Na-β-$Al_2O_3$ and $Sn(HPO_4)_2 \cdot H_2O$.

7. An electrochromic device according to claim 1 wherein said electrochromic material is selected from the group consisting of $Mo_2O_3$, $Ir_2O_3$, NiO, $V_2O_5$, $Wo_3$, biologen, polythiophen, polyaniline, polypyrrole and metal phthalocyanine.

8. An electrochromic device according to claim 1 wherein said aminosilane compound is selected from the group consisting of 3-aminopropyltriethoxysilane, 3-aminopropyldiisopropylethoxysilane, 3-aminopropylmethyidiethoxysilane, 3-aminopropyltrichrolosilane, 3-aminopropylpolydimethylsiloxane, N-(2-aminoethyl)-3-aminopropyltrimethoxysilane and 3-aminopropyltris(methoxyethoxy)silane.

9. An electrochromic device according to claim 1 wherein said ultraviolet absorptive layer is added with an optional compound selected from the group consisting of silicone resins, epoxysilanes, polyether-modified polysiloxane and inorganic fine particle dispersions.

10. An electrochromic device according to claim 1 wherein said ultraviolet absorptive layer is 0.5 to 50 μm in thickness.

11. An electrochromic device according to claim 1 wherein said epoxysilane compound is a compound of the formulae selected from the group consisting of the formulae (XIX) and (XX),
said formula (XIX) being represented by

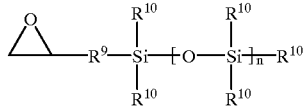

said formula (XX) being represented by

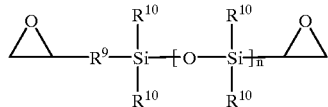

wherein $R^9$ is a $C_1$–$C_{10}$ alkylene group or a divalent group represented by the formula —R—O—$R^1$ wherein R and $R^1$ each are an alkylene group, the groups $R^1$ may be the same or different and each are a hydrogen atom, a hydroxyl group, a halogen atom, a $C_1$–$C_{10}$ alkyl or alkoxy group and a $C_6$–$C_{10}$ aryl group provided that at least one of the groups Re is an alkoxy group or a hydroxyl group and n is an integer between 0 and 3.

12. An electrochromic device according to claim 1 wherein said epoxysilane compound is selected from the group consisting of 3-glycidoxypropyntrimethoxysilane, dimethoxy-3-glycidoxypropylmethylsilane, 2-(3,4-epoxycyclohexylethyl)trimethoxysilane, 2-(3,4-epoxycyclohexylethyl)triethoxysilane and dimethylethoxy-3-glycidoxypropylsilane.

13. An electrochromic device according to claim 1 wherein said Component (B) is used in an amount of 5–90 mass percent, based on total mass of Components (A) and (B).

14. An electrochromic device according to claim 1 wherein said Component (D) is used in an amount of 10–500 mass percent, based on total mass of Components (A) and (B).

15. An electrochromic device according to claim 1 wherein said reaction product is obtained in the presence of a silicone resin having a functional group which can be reacted with the alkoxysilyl group of said Component (A).

16. An electrochromic device according to claim 15 wherein said silicone resin is used in amount of 5–300 mass percent, based on total mass of Components (A) and (B).

17. An electrochromic device according to claim 1 wherein said reaction product is derived in the presence of a compound represented by the formula

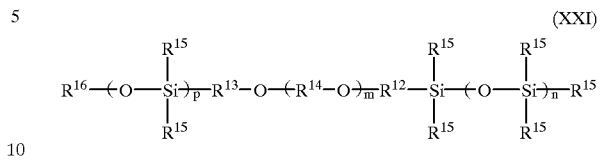

wherein $R^{12}$, $R^{13}$ and $R^{14}$ may be the same or different and are a $C_1$–$C_{10}$ alkylene group, the groups $R^{15}$ may be the same or different and each are selected from the group consisting of a hydrogen atom, a hydroxyl group, a halogen atom, a $C_1$–$C_{10}$ alkyl and alkoxy group and a $C_6$–$C_{10}$ aryl group, provided that at least one of the groups $R^{15}$ is a $C_1$–$C_{10}$ alkoxy group, and m, n and p are each an integer of greater than 0.

18. An electrochromic device according to claim 17 wherein said compound of the formula (XXI) is selected from the group consisting of tetraethyleneglycol-bis(triethoxysilylethyl)ether, polyethyleneglycol-bis(triethoxysilylethyl)ether and polypropyleneglycol-bis(triethoxysilylethyl)ether.

19. An electrochromic device according to claim 1 7 wherein said compound of the formula (XXI) is used in an amount of 10–50 mass percent, based on total mass of Components (A) and (B).

20. An electrochromic device according to claim 1 wherein said reaction product is further added with an inorganic fine particle dispersion.

21. An electrochromic device according to claim 20 wherein said inorganic fine particle dispersion is used in an amount of 5–400 mass percent, based on total mass of Components (A) and (B).

22. An electrochromic device according to claim 1 wherein said reaction product is obtained under the condition that 50 mol percent or more of the aminosilane of said Component (A) form an amide bond.

23. An electrochromic device according to claim 1 wherein said reaction product is obtained in the presence of a solvent at a reaction temperature of 60–350° C. for a reaction period of time of 5 minutes–50 hours.

24. An electrochromic device according to claim 23 wherein said solvent is selected from the group consisting of an aromatic solvent and a ketone-based solvent.

* * * * *